(12) United States Patent
Ishizuka et al.

(10) Patent No.: US 8,150,600 B2
(45) Date of Patent: Apr. 3, 2012

(54) CONTROL DEVICE AND CONTROL SYSTEM OF INTERNAL COMBUSTION ENGINE

(75) Inventors: Koji Ishizuka, Chita-gun (JP); Kenichiro Nakata, Anjo (JP)

(73) Assignee: Denso Corporation, Kariya (JP)

( * ) Notice: Subject to any disclaimer, the term of this patent is extended or adjusted under 35 U.S.C. 154(b) by 769 days.

(21) Appl. No.: 12/255,936

(22) Filed: Oct. 22, 2008

(65) Prior Publication Data

US 2009/0112444 A1 Apr. 30, 2009

(30) Foreign Application Priority Data

Oct. 24, 2007 (JP) ................................. 2007-276026

(51) Int. Cl.
*F02D 43/00* (2006.01)
*F02D 41/30* (2006.01)
(52) U.S. Cl. .......................... 701/105; 701/103; 123/435
(58) Field of Classification Search .................. 123/435, 123/568.11, 568.26; 701/103–105
See application file for complete search history.

(56) References Cited

U.S. PATENT DOCUMENTS

| | | | |
|---|---|---|---|
| 5,243,947 A | | 9/1993 | Yamamoto et al. |
| 5,485,822 A | | 1/1996 | Hirose et al. |
| 5,697,338 A | | 12/1997 | Hirose et al. |
| 5,718,203 A | * | 2/1998 | Shimada et al. ............ 123/305 |
| 5,752,486 A | | 5/1998 | Nakashima et al. |
| 5,848,581 A | | 12/1998 | Hirose et al. |
| 7,117,082 B2 | | 10/2006 | Kohira et al. |
| 7,201,139 B2 | * | 4/2007 | Fuwa et al. ................ 123/306 |
| 7,317,983 B2 | | 1/2008 | Ishizuka et al. |
| 2006/0293828 A1 | | 12/2006 | Ishizuka et al. |
| 2007/0089697 A1 | | 4/2007 | Hara et al. |
| 2008/0228374 A1 | * | 9/2008 | Ishizuka et al. ............ 701/103 |
| 2009/0084356 A1 | * | 4/2009 | Nakata et al. ............... 123/447 |

FOREIGN PATENT DOCUMENTS

| | | |
|---|---|---|
| EP | 0 684 374 | 8/1992 |
| JP | 6-280717 | 10/1994 |
| JP | 11-159385 | 6/1999 |
| JP | 2000-291466 | 10/2000 |
| JP | 2001-82298 | 3/2001 |
| JP | 2004-270531 | 9/2004 |

(Continued)

OTHER PUBLICATIONS

Extended European Search Report dated Feb. 24, 2009, issued in corresponding European Application No. 08167407.9-2311.

(Continued)

*Primary Examiner* — John Kwon
*Assistant Examiner* — Johnny Hoang
(74) *Attorney, Agent, or Firm* — Nixon & Vanderhye P.C.

(57) ABSTRACT

An internal combustion engine control device has a cylinder pressure sensor for sensing pressure in a combustion chamber and a fuel pressure sensor for sensing fuel pressure fluctuating in connection with fuel injection from an injector. The control device calculates a combustion characteristic of a cylinder (for example, an ignition delay or a combustion rate) based on both of a cylinder pressure sensing value and a fuel pressure sensing value. The control device corrects an EGR quantity, supercharging pressure, and injection start timing in accordance with the calculated combustion characteristic. Thus, the control device performs cooperative control of the injection start timing (an injection mode), the supercharging pressure and the EGR quantity (intake air conditions) in accordance with the combustion characteristic of the cylinder.

23 Claims, 9 Drawing Sheets

FOREIGN PATENT DOCUMENTS

JP          2006-152944        6/2006
WO        WO 2006/041867    4/2006

OTHER PUBLICATIONS

Japanese Office Action dated May 22, 2009, issued in corresponding Japanese Application No. 2007-276026, with English translation.
U.S. Appl. No. 11/930,668, Koji Ishizuka et al., filed Oct. 31, 2007.
U.S. Appl. No. 12/179,235, Koji Ishizuka et al., filed Jul. 24, 2008.
U.S. Appl. No. 12/194,130, Kenichiro Nakata et al., filed Aug. 19, 2008.
U.S. Appl. No. 12/197,447, Kenichiro Nakata et al., filed Aug. 25, 2008.
U.S. Appl. No. 12/210,409, Koji Ishizuka et al., filed Sep. 15, 2008.
U.S. Appl. No. 12/195,609, Kenichiro Nakata et al., filed Aug. 21, 2008.
U.S. Appl. No. 12/210,440, Kenichiro Nakata et al., filed Sep. 15, 2008.
U.S. Appl. No. 12/235,917, Kenichiro Nakata et al., filed Sep. 23, 2008.
U.S. Appl. No. 12/233,800, Kenichiro Nakata et al., filed Sep. 19, 2008.
U.S. Appl. No. 12/186,038, Kenichiro Nakata et al., filed Aug. 5, 2008.
U.S. Appl. No. 12/194,917, Kenichiro Nakata et al., filed Aug. 20, 2008.
U.S. Appl. No. 12/187,638, Kenichiro Nakata et al., filed Aug. 7, 2008.
U.S. Appl. No. 12/189,376, Kenichiro Nakata et al., filed Aug. 11, 2008.
U.S. Appl. No. 12/236,882, Koji Ishizuka et al., filed Sep. 24, 2008.
U.S. Appl. No. 12/201,426, Kenichiro Nakata et al., filed Aug. 29, 2008.
U.S. Appl. No. 12/256,100, Koji Ishizuka et al., filed Oct. 22, 2008.
U.S. Appl. No. 12/258,726, Koji Ishizuka et al., filed Oct. 27, 2008.
U.S. Appl. No. 12/258,750, Koji Ishizuka et al., filed Oct. 27, 2008.

\* cited by examiner

CONTROL DEVICE AND CONTROL SYSTEM OF INTERNAL COMBUSTION ENGINE

CROSS REFERENCE TO RELATED APPLICATION

This application is based on and incorporates herein by reference Japanese Patent Application No. 2007-276026 filed on Oct. 24, 2007.

BACKGROUND OF THE INVENTION

1. Field of the Invention

The present invention relates to an internal combustion engine control device that controls a fuel injection mode and an intake air condition.

2. Description of Related Art

Conventionally, there has been proposed a control device that senses pressure in a combustion chamber (cylinder pressure) with a cylinder pressure sensor and senses a combustion characteristic of the cylinder based on the cylinder pressure sensing value, the control device controlling an internal combustion engine in accordance with the sensed combustion characteristic. For example, a control device for a diesel engine described in Patent document 1 (JP-A-2005-351161) calculates an energy generation rate (a heat release rate) caused by combustion of fuel in a combustion chamber based on the cylinder pressure sensing value and detects actual ignition timing as a combustion characteristic by using the calculated heat release rate.

The control device corrects an injection mode as follows in accordance with a combustion variation such as a deviation of the detected ignition timing from desired ignition timing. That is, in the case of a multi-stage injection (i.e., multi-injection) of performing the injection multiple times during one combustion cycle, the control device corrects a main injection start timing, a pilot injection quantity or the like. In the case of a single-stage injection, the control device corrects an injection start timing.

However, only information after the combustion is known from the cylinder pressure sensing value. Therefore, it is impossible to determine which of the injection mode and the intake air condition is the cause of the combustion variation sensed from the cylinder pressure sensing value. In the above-described conventional control, only the injection mode is corrected irrespective of which is the cause when the combustion variation is detected. Therefore, only the injection mode such as the injection start timing is corrected even when the combustion variation is caused by a variation in the intake air condition such as an EGR quantity (exhaust gas recirculation quantity) or supercharging pressure. Therefore, it cannot be said that the injection mode and the intake air condition are fully optimized. There exists a room for improvement.

SUMMARY OF THE INVENTION

It is an object of the present invention to provide an internal combustion engine control device aiming to optimize both of an injection mode and an intake air condition.

According to an aspect of the present invention, an internal combustion engine control device controlling an injection mode of fuel injected from an injector provided in an internal combustion engine and a condition of an intake air, which flows into a combustion chamber of the internal combustion engine and which is mixed with the fuel, has a cylinder pressure obtaining section, a fuel pressure obtaining section, a combustion characteristic calculating section, and a controlling section.

The cylinder pressure obtaining section obtains a cylinder pressure sensing value from a cylinder pressure sensor that senses pressure in the combustion chamber. The fuel pressure obtaining section obtains a fuel pressure sensing value from a fuel pressure sensor that senses pressure of the fuel fluctuating in connection with the fuel injection from the injector. The combustion characteristic calculating section calculates a combustion characteristic concerning combustion in a cylinder based on both of the obtained sensing values of the cylinder pressure sensing value and the fuel pressure sensing value. The controlling section controls the injection mode and the intake air condition in accordance with the combustion characteristic calculated by the combustion characteristic calculating section.

The pressure of the fuel (fuel pressure) supplied to the injector fluctuates in connection with the injection of the fuel. There is a strong correlation between the fuel pressure fluctuation and an actual injection state. For example, the fuel pressure P fluctuates to start decreasing in connection with an actual injection start (refer to part (c) of FIG. 5). An injection rate R changes with the fluctuation of the fuel pressure P (refer to parts (b) and (c) of FIG. 5), and an integration value of the injection rate change (a shaded area S shown in part (b) of FIG. 5) corresponds to the actual injection quantity Q. Therefore, if the above-described fuel pressure is sensed, the injection modes such as the injection start timing and the injection quantity can be calculated.

The inventors focused attention on this point and invented the scheme of the above-described aspect of the present invention of obtaining the pressure of the fuel (i.e., the fuel pressure sensing value) fluctuating in connection with the fuel injection from the injector as information before the combustion in addition to the cylinder pressure sensing value as information after the combustion. With such the scheme, in addition to the ignition timing and a combustion quantity (the information after the combustion) that can be calculated from the cylinder pressure sensing value, the injection mode that can be calculated from the fuel pressure sensing value can be obtained as the information before the combustion.

According to the above-described aspect of the present invention, the control device calculates the combustion characteristic (for example, an ignition delay or a combustion rate mentioned later) concerning the combustion in the cylinder based on both of the obtained sensing values of the cylinder pressure sensing value (for example, ignition timing or a combustion quantity) and the fuel pressure sensing value (for example, an injection mode such as the injection start timing or the injection quantity). The control device controls the injection mode and the intake air condition in accordance with the calculated combustion characteristic. Therefore, both of the injection mode and the intake air condition can be fully optimized as compared with the conventional control that controls the injection start timing in accordance with the ignition timing calculated from the cylinder pressure sensing value.

Each of following seven aspects of the present invention uses an ignition delay from the injection start to the ignition of the fuel as the combustion characteristic.

According to another aspect of the present invention, the control device further has an ignition timing calculating section for calculating ignition timing based on the cylinder pressure sensing value and an injection start timing calculating section for calculating injection start timing of the fuel based on the fuel pressure sensing value. The combustion characteristic calculating section calculates an ignition delay from an injection start to an ignition as the combustion characteristic based on the calculated ignition timing and the calculated injection start timing.

According to the above-described aspect of the present invention, the ignition delay is calculated based on the actual injection start timing obtained with the fuel pressure sensing value. Accordingly, the ignition delay can be obtained with high accuracy. Since the injection mode and the intake air condition are controlled in accordance with such the highly accurate ignition delay, both of the injection mode and the intake air condition can be fully optimized. When the calculated injection start timing and the calculated ignition timing vary even if the ignition delay is the same, control may be performed to change the control contents of the injection mode and the intake air condition in accordance with these timings.

According to another aspect of the present invention, when the internal combustion engine is in a steady operation state, the controlling section controls the intake air condition to a condition restricting the combustion if the ignition delay is shorter than an assumed time and controls the intake air condition to a condition promoting the combustion if the ignition delay is longer than the assumed time. According to such the construction, control for bringing the ignition timing to desired timing can be realized easily. If the intake air condition such as the EGR quantity or the supercharging pressure is changed, there occurs a response delay until the change is reflected in the combustion state. Therefore, according to the above-described aspect of the present invention, the intake air condition is controlled in the steady operation state of the internal combustion engine.

According to another aspect of the present invention, the internal combustion engine is a multi-cylinder internal combustion engine having a plurality of injectors, and the assumed time is an average value of ignition delays, which are calculated respectively for a plurality of cylinders in a state where the injection start timing and an injection quantity are respectively equalized among the injectors.

According to the above-described aspect of the present invention, the injection start timing and the injection quantity are respectively equalized among the cylinders. Therefore, when there occurs a combustion variation among the cylinders, a factor of the injection mode can be removed from the factors of the variation. Therefore, when an ignition delay of a certain cylinder varies with respect to an average value (i.e., an assumed time) of multiple ignition delays, the intake air condition can be identified as the factor of the variation. Therefore according to the above-described aspect of the present invention that controls the intake air condition in accordance with the ignition delay in the state where the intake air condition is identified as the factor in this way, both of the injection mode and the intake air condition can be fully optimized.

According to another aspect of the present invention, the internal combustion engine has an exhaust gas recirculation valve that adjusts an exhaust gas recirculation quantity of exhaust gas recirculated from an exhaust system to an intake system. The controlling section controls an opening degree of the exhaust gas recirculation valve to increase the exhaust gas recirculation quantity when the ignition delay is shorter than the assumed time and controls the opening degree of the exhaust gas recirculation valve to decrease the exhaust gas recirculation quantity when the ignition delay is longer than the assumed time. With such the construction, control for bringing the ignition timing to desired timing can be easily realized.

According to another aspect of the present invention, the internal combustion engine has a supercharger for supercharging the intake air with the use of the exhaust gas as a source of a driving force. The supercharger is configured to be able to vary a conversion rate, at which the supercharger converts a fluid energy of the exhaust gas into the driving force, thereby adjusting supercharging pressure. The controlling section controls the conversion rate to decrease the supercharging pressure when the ignition delay is shorter than the assumed time and controls the conversion rate to increase the supercharging pressure when the ignition delay is longer than the assumed time. With such the construction, control for bringing the ignition timing to desired timing can be easily realized.

A variable capacity turbocharger may be employed as an example of the above-described construction capable of variably setting the rate, at which the fluid energy of the exhaust gas is converted into the driving force. More specifically, a construction of providing a variable vane in a turbine wheel constituting the turbocharger, a construction providing a variable flap for adjusting a blow-off quantity in a nozzle blowing off the exhaust gas toward the turbine wheel, or the like may be employed.

According to another aspect of the present invention, when the internal combustion engine is in a transient operation state, the controlling section controls the injection mode to a mode restricting the combustion if the ignition delay is shorter than an assumed time and controls the injection mode to a mode promoting the combustion if the ignition delay is longer than the assumed time.

As mentioned above, if the intake air condition such as the EGR quantity or the supercharging pressure is changed, there occurs a response delay until the change is reflected in the combustion state. In contrast, a response delay in the case where the injection mode such as the injection start timing is changed is small. Therefore, the injection mode is controlled in the mode according to the above-described aspect of the present invention when the internal combustion engine is in the transient operation state. Thus, control for bringing the ignition timing to desired timing can be easily realized.

According to another aspect of the present invention, the controlling section controls the injector to delay the injection start timing if the ignition delay is shorter than the assumed time and controls the injector to advance the injection start timing if the ignition delay is longer than the assumed time. With such the construction, the control for bringing the ignition timing to desired timing can be easily realized even when the engine is in the transient operation state.

Each of following seven aspects of the present invention employs a combustion rate as the combustion characteristic. The combustion rate indicates a rate, at which the injected fuel contributes to the combustion.

According to another aspect of the present invention, the control device further has an actual combustion quantity calculating section and a theoretical combustion quantity calculating section. The actual combustion quantity calculating section calculates an actual combustion quantity or a physical quantity equivalent to the actual combustion quantity based on the cylinder pressure sensing value. The theoretical combustion quantity calculating section calculates an actual injection quantity based on the fuel pressure sensing value and calculates a theoretical combustion quantity converted from the calculated actual injection quantity or a physical quantity equivalent to the theoretical combustion quantity. The combustion characteristic calculating section calculates a combustion rate as the combustion characteristic based on the calculated actual combustion quantity and the calculated theoretical combustion quantity. The combustion rate indicates a rate, at which the fuel injected from the injector contributes to the combustion.

According to the above-described aspect of the present invention, the combustion rate is calculated based on the actual injection start timing obtained with the fuel pressure sensing value. Accordingly, the combustion rate can be obtained with high accuracy. Since the injection mode and the intake air condition are controlled in accordance with such the highly accurate combustion rate, both of the injection mode and the intake air condition can be fully optimized. If the actual combustion quantity based on the cylinder pressure sensing value and the combustion quantity calculated based on the fuel pressure sensing value vary although the combustion rate is the same, control may be performed to change the control contents of the injection mode and the intake air condition in accordance with the combustion quantities.

According to another aspect of the present invention, when the internal combustion engine is in a steady operation state, the controlling section controls the intake air condition to a condition restricting the combustion if the combustion rate is higher than an assumed rate and controls the intake air condition to a condition promoting the combustion if the combustion rate is lower than the assumed rate. With such the construction, control for bringing the combustion quantity to a desired quantity can be easily realized. If the intake air condition such as the EGR quantity or the supercharging pressure is changed, there occurs a response delay until the change is reflected in the combustion state. Therefore, according to the above-described aspect of the present invention, the intake air condition is controlled when the engine is in the steady operation state.

According to another aspect of the present invention, the internal combustion engine is a multi-cylinder internal combustion engine having a plurality of injectors. The assumed rate is an average value of combustion rates, which are calculated respectively for a plurality of cylinders in a state where injection start timing and an injection quantity are respectively equalized among the plurality of injectors.

According to the above-described aspect of the present invention, the injection start timing and the injection quantity are respectively equalized among the cylinders. Therefore, when there occurs a combustion variation among the cylinders, a factor of the injection mode can be removed from the factors of the variation. Therefore, when a combustion rate of a certain cylinder varies with respect to an average value of multiple combustion rates (i.e., an assumed rate), the intake air condition can be identified as the factor of the variation. Therefore, according to the above-described aspect of the present invention that controls the intake air condition in accordance with the combustion rate in the state where the intake air condition is identified as the factor in this way, both of the injection mode and the intake air condition can be fully optimized.

According to another aspect of the present invention, the internal combustion engine has an exhaust gas recirculation valve for regulating an exhaust gas recirculation quantity of exhaust gas recirculated from an exhaust system to an intake system. The controlling section controls an opening degree of the exhaust gas recirculation valve to increase the exhaust gas recirculation quantity when the combustion rate is higher than the assumed rate and controls the opening degree of the exhaust gas recirculation valve to decrease the exhaust gas recirculation quantity when the combustion rate is lower than the assumed rate. With such the construction, control for bringing the combustion quantity to a desired quantity can be easily realized.

According to another aspect of the present invention, the internal combustion engine has a supercharger that supercharges the intake air with the use of the exhaust gas as a source of a driving force. The supercharger is configured to be able to vary a conversion rate, at which the supercharger converts a fluid energy of the exhaust gas into the driving force, thereby adjusting supercharging pressure. The controlling section controls the conversion rate to decrease the supercharging pressure when the combustion rate is higher than an assumed rate and controls the conversion rate to increase the supercharging pressure when the combustion rate is lower than the assumed rate. With such the construction, control for bringing the combustion quantity to a desired quantity can be easily realized.

According to another aspect of the present invention, when the internal combustion engine is in a transient operation state, the controlling section controls the injection mode to a mode restricting the combustion if the combustion rate is higher than an assumed rate and controls the injection mode to a mode promoting the combustion if the combustion rate is lower than the assumed rate.

As mentioned above, if the intake air condition such as the EGR quantity or the supercharging pressure is changed, there occurs a response delay until the change is reflected in the combustion state. In contrast, a response delay in the case where the injection mode such as the injection start timing is changed is small. Therefore, the injection mode is controlled in the mode according to the above-described aspect of the present invention when the internal combustion engine is in the transient operation state. Thus, control for bringing the combustion quantity to a desired quantity can be easily realized.

According to another aspect of the present invention, the controlling section controls the injector to delay the injection start timing if the combustion rate is higher than the assumed rate and controls the injector to advance the injection start timing if the combustion rate is lower than the assumed rate. With such the construction, control for bringing the combustion quantity to a desired quantity can be easily realized even when the internal combustion engine is in the transient operation state.

According to each of following two aspects of the present invention, control for bringing the ignition timing or the combustion quantity to desired timing or a desired quantity can be easily realized even when the engine is in the transient operation state. That is, according to another aspect of the present invention, when the internal combustion engine is in a transient operation state, the controlling section corrects the injection mode by changing pressure of the fuel supplied to the injector in accordance with a correction value used for increasing or decreasing the exhaust gas recirculation quantity. According to another aspect of the present invention, when the internal combustion engine is in a transient operation state, the controlling section corrects the injection mode by changing pressure of the fuel supplied to the injector in accordance with a correction value used for increasing or decreasing the supercharging pressure.

According to another aspect of the present invention, the internal combustion engine is a multi-cylinder internal combustion engine having a plurality of injectors. The fuel pressure sensor is provided for each of the plurality of injectors. The cylinder pressure sensor is provided to at least one of a plurality of cylinders.

For example, if the cylinder pressure sensors are provided to all of the multiple cylinders, the combustion characteristics can be calculated by obtaining the cylinder pressure sensing values and the fuel pressure sensing values about all the cylinders. Therefore, the injection mode can be controlled in accordance with the combustion characteristic of each cylinder, so the injection mode and the intake air condition of each cylinder can be further optimized. Moreover, in this case, sine the combustion characteristic of each cylinder can be grasped, optimization for reducing the variation in the combustion characteristic among the cylinders can be easily realized.

When the cylinder pressure sensor is provided to, for example, only one representative cylinder, the combustion characteristics of the other cylinders may be calculated by considering that the cylinder pressure of the other cylinders is the same as that of the representative cylinder. Thus, the above-described optimization for reducing the variation of the combustion characteristic among the cylinders can be realized while aiming to reduce a cost by reducing the number of the cylinder pressure sensors.

According to another aspect of the present invention, the internal combustion engine is configured to distribute and supply the fuel from a pressure accumulator, which accumulates the fuel, to the injector. The fuel pressure sensor is arranged in a fuel passage, which extends from the pressure accumulator to an injection hole of the injector, at a position closer to the injection hole than the pressure accumulator.

A construction arranging a fuel pressure sensor (a rail pressure sensor) in a pressure accumulator has been known conventionally. If a pressure fluctuation in an injection hole is sensed with such the rail pressure sensor, a pressure fluctuation in a state where the pressure fluctuation in the injection hole is attenuated inside the pressure accumulator is sensed. Therefore, the pressure fluctuation caused in connection with the injection cannot be sensed with high accuracy.

As contrasted thereto, according to the above-described aspect of the present invention, the fuel pressure sensor is arranged in the fuel passage, which extends from the pressure accumulator to the injection hole, at the position closer to the injection hole than the pressure accumulator. Therefore, the pressure fluctuation in the injection hole can be sensed before the pressure fluctuation attenuates in the pressure accumulator. Therefore, the pressure fluctuation caused with the injection can be sensed with high accuracy. Eventually, the combustion characteristic calculated using the fuel pressure sensing value can be obtained with high accuracy.

According to another aspect of the present invention, the fuel pressure sensor is fixed to the injector. Therefore, the fixation position of the fuel pressure sensor is closer to the injection hole of the injector than in the case where the fuel pressure sensor is fixed to a pipe connecting the pressure accumulator and the injector. Accordingly, the pressure fluctuation in the injection hole can be sensed more appropriately than in the case where the pressure fluctuation is sensed after the pressure fluctuation in the injection hole attenuates in the pipe.

In the case where the fuel pressure sensor is fixed to the injector as described above, according to another aspect of the present invention, the fuel pressure sensor is fixed to a fuel inlet of the injector. According to another aspect of the present invention, the fuel pressure sensor is mounted inside the injector to sense fuel pressure in an internal fuel passage extending from the fuel inlet of the injector to the injection hole of the injector.

The fixing structure of the fuel pressure sensor can be simplified in the case where the fuel pressure sensor is fixed to the fuel inlet as compared with the case where the fuel pressure sensor is mounted inside the injector. When the fuel pressure sensor is mounted inside the injector, the fixing position of the fuel pressure sensor is closer to the injection hole than in the case where the fuel pressure sensor is fixed to the fuel inlet. Therefore, the pressure fluctuation in the injection hole can be sensed more precisely.

According to another aspect of the present invention, an orifice is provided in a fuel passage, which extends from the pressure accumulator to a fuel inlet of the injector, for attenuating a pressure pulsation of the fuel in the pressure accumulator. The fuel pressure sensor is arranged downstream of the orifice with respect to a fuel flow direction. If the fuel pressure sensor is arranged upstream of the orifice, the pressure fluctuation after the pressure fluctuation in the injection hole is attenuated by the orifice is sensed. In contrast, the fuel pressure sensor is arranged downstream of the orifice according to the above-described aspect of the present invention. Accordingly, the pressure fluctuation in the injection hole can be sensed more appropriately since the pressure fluctuation before the pressure fluctuation is attenuated by the orifice can be sensed.

According to yet another aspect of the present invention, an internal combustion engine control system has at least one of a fuel pressure sensor that senses pressure of fuel fluctuating in connection with fuel injection from an injector and a cylinder pressure sensor that senses pressure in a cylinder, and the internal combustion engine control device according to any one of the above-described aspects of the present invention. This internal combustion engine control system can exert the above-mentioned various effects similarly.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 10 is a timing chart showing a relationship among changes in a fuel pressure sensing value, a cylinder pressure sensing value and the like.

DETAILED DESCRIPTION OF EXAMPLE EMBODIMENTS

Hereafter, embodiments of the present invention will be described with reference to the drawings. In the following description of the respective embodiments, the same sign is used for identical or equivalent parts.

First, an outline of an engine (an internal combustion engine) mounted with an internal combustion engine control device according to a first embodiment of the present invention will be explained.

The device according to the present embodiment is used for a diesel engine (an internal combustion engine) for a four-wheeled vehicle. The engine performs injection supply (direct injection supply) of high-pressure fuel (for example, light oil at injection pressure of 1000 atmospheres or higher) directly into a combustion chamber. It is assumed that the engine according to the present embodiment is a four-stroke reciprocating diesel engine (an internal combustion engine) having multiple cylinders (for example, in-line four cylinders). In each of the four cylinders #1-#4, a combustion cycle consisting of four strokes of an intake stroke, a compression stroke, a combustion stroke, and an exhaustion stroke is sequentially performed in the order of the cylinders #1, #3, #4, and #2 in the cycle of 720° CA, and in more detail, while the combustion cycles are deviated from each other by 180° CA between the cylinders.

Next, a fuel system of the engine will be explained with reference to FIGS. 1 to 5.

Figure 1:
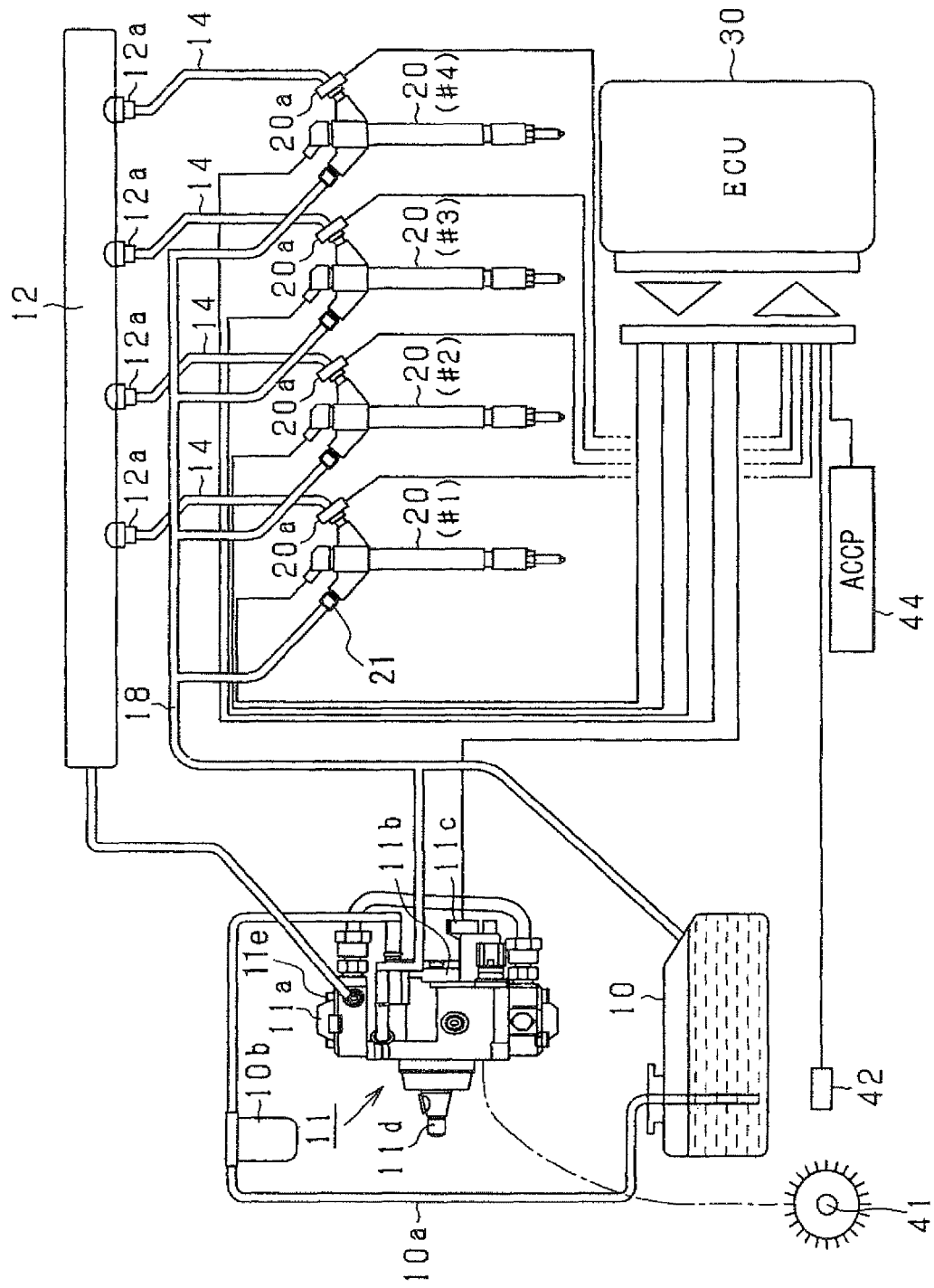
FIG. 1 is a configuration diagram showing a fuel system applied with an internal combustion engine control device according to a first embodiment of the present invention.

FIG. 1 is a configuration diagram of a common rail fuel injection system according to the present embodiment. An ECU 30 (an electronic control unit) provided in the system adjusts a supply quantity of current supplied to a suction control valve 11c, thereby controlling a fuel discharge quantity of a fuel pump 11 to a desired value. Thus, the ECU 30 performs feedback control (for example, PID control) for conforming fuel pressure in a common rail 12 (a pressure accumulator), i.e., current fuel pressure measured with a fuel pressure sensor 20a, to a target value (target fuel pressure). The ECU 30 controls a fuel injection quantity for a predetermined cylinder of the target engine and eventually an output of the engine (i.e., rotation speed of an output shaft or torque) to desired magnitudes based on the fuel pressure.

The devices constituting the fuel supply system including the fuel tank 10, the fuel pump 11, the common rail 12, and the injectors 20 (fuel injection valves) are arranged in this order from a fuel flow upstream side. The fuel pump 11 consists of a high-pressure pump 11a and a low-pressure pump 11b driven by an output of the target engine. The fuel pump 11 is structured such that the fuel drawn by the low-pressure pump 11b from the fuel tank 10 is pressurized and discharged by the high-pressure pump 11a. A fuel pumping quantity sent to the high-pressure pump 11a and an eventual fuel discharge quantity of the fuel pump 11 are metered by the suction control valve 11c (SCV) provided on a fuel suction side of the fuel pump 11. The fuel pump 11 can control the fuel discharge quantity from the pump 11 to a desired value by regulating the drive current (and eventually, an opening degree) of the suction control valve 11c.

The low-pressure pump 11b is constituted, for example, as a trochoid feed pump. The high-pressure pump 11a consists of a plunger pump, for example. The high-pressure pump 11a is structured to be able to sequentially pump the fuel, which is sent to pressurization chambers, at predetermined timing by reciprocating predetermined plungers (for example, three plungers) in axial directions thereof with an eccentric cam (not illustrated) respectively.

The fuel in the fuel tank 10 is pressure-fed (pumped) to the common rail 12 by the fuel pump 11 and is accumulated in the common rail 12 at a high-pressure state. Then, the fuel is distributed and supplied to the injectors 20 of the cylinders #1 to #4 respectively through high-pressure pipes 14 provided to the respective cylinders. Fuel discharge holes 21 of the injectors 20(#1) to 20(#4) are connected with a pipe 18 for returning excess fuel to the fuel tank 10. An orifice 12a (a fuel pulsation reducing section) is provided between the common rail 12 and the high-pressure pipe 14 for attenuating a pressure pulsation of the fuel flowing from the common rail 12 to the high-pressure pipe 14.

Figure 2:
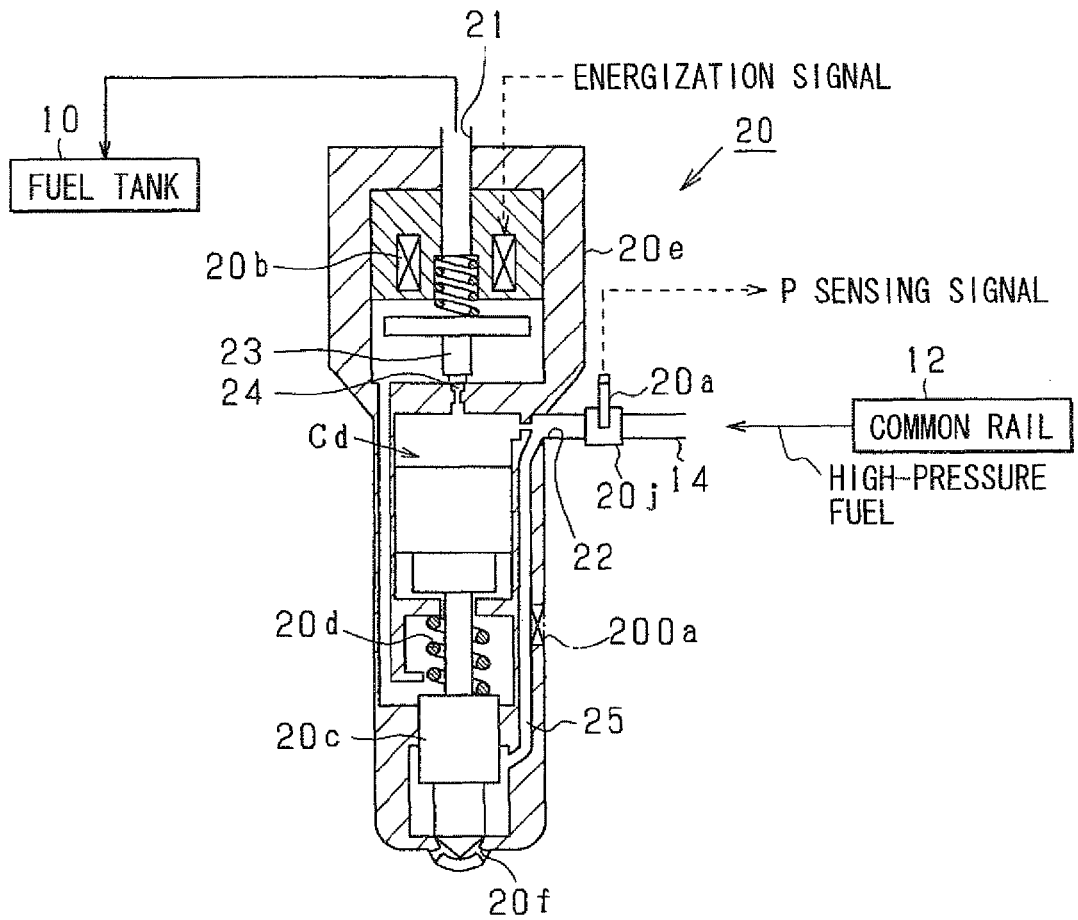
FIG. 2 is an internal side view schematically showing an internal structure of an injector according to the first embodiment.

A detailed structure of the injector 20 is shown in FIG. 2. Basically, the four injectors 20(#1) to 20(#4) have the same structure (for example, a structure shown in FIG. 2). Each injector 20 is a hydraulic drive type injector using the engine combustion fuel (i.e., the fuel in the fuel tank 10). In the injector 20, a driving power for the fuel injection is transmitted through an oil pressure chamber Cd (i.e., a control chamber). As shown in FIG. 2, the injector 20 is structured as a fuel injection valve of a normally-closed type that is brought to a valve-closed state when de-energized.

The high-pressure fuel sent from the common rail 12 flows into a fuel inlet 22 formed in a housing 20e of the injector 20 and a part of the inflowing high-pressure fuel flows into the oil pressure chamber Cd and the other part of the inflowing high-pressure fuel flows toward injection holes 20f. A leak hole 24 is formed in the oil pressure chamber Cd and is opened and closed by a control valve 23. If the leak hole 24 is opened by the control valve 23, the fuel in the oil pressure chamber Cd is returned to the fuel tank 10 through the fuel discharge hole 21 from the leak hole 24.

When the fuel injection is performed with the injector 20, the control valve 23 is operated in accordance with an energization state (energization/de-energization) of a solenoid 20b constituting a two-way electromagnetic valve. Thus, a sealed degree of the oil pressure chamber Cd and eventually pressure in the oil pressure chamber Cd (equivalent to back pressure of a needle valve 20c) are increased/decreased. Due to the increase/decrease in the pressure, the needle valve 20c reciprocates (moves upward and downward) inside the housing 20e along with or against an extensional force of a spring 20d (a coil spring) (i.e., an elastic force of the spring 20d to extend). Accordingly, a fuel supply passage 25 to the injection holes 20f (a necessary number of which are bored) is opened/closed at a halfway thereof (more specifically, at a tapered seat face, which the needle valve 20c is seated on and which the needle valve 20c is separated from in accordance with the reciprocating movement of the needle valve 20c).

Drive control of the needle valve 20c is performed through on-off control. That is, a pulse signal (an energization signal) directing ON/Off is sent from the ECU 30 to a drive section (the two-way electromagnetic valve) of the needle valve 20c. The needle valve 20c lifts and opens the injection holes 20f when the pulse is ON (or OFF), and the needle valve 20c descends to block the injection holes 20f when the pulse is OFF (or ON).

The pressure increase processing of the oil pressure chamber Cd is performed by the fuel supply from the common rail 12. Pressure reduction processing of the oil pressure chamber Cd is performed by operating the control valve 23 by the energization to the solenoid 20b and thus opening the leak hole 24. Thus, the fuel in the oil pressure chamber Cd is returned to the fuel tank 10 through the pipe 18 (shown in FIG. 1) connecting the injector 20 and the fuel tank 10. That is, the operation of the needle valve 20c that opens and closes the injection holes 20f is controlled by adjusting the fuel pressure in the oil pressure chamber Cd through the opening and closing operation of the control valve 23.

Thus, the injector 20 has the needle valve 20c that performs valve opening and valve closing of the injector 20 by opening and closing the fuel supply passage 25 extending to the injection holes 20f through a predetermined reciprocation operation inside the valve body (i.e., the housing 20e). In a non-driven state, the needle valve 20c is displaced in a valve-closing direction by the force (the extensional force of the spring 20d) constantly applied to the needle valve 20c in the valve-closing direction. In a driven state, the needle valve 20c is applied with a driving force, so the needle valve 20c is displaced in a valve-opening direction against the extensional force of the spring 20d. The lift amount of the needle valve 20c changes substantially symmetrically between the non-driven state and the driven state.

A fuel pressure sensor 20a (also refer to FIG. 1) for sensing the fuel pressure is fixed to the injector 20. The fuel inlet 22 formed in the housing 20e and the high-pressure piping 14 are connected through a jig 20j, and the fuel pressure sensor 20a is fixed to the jig 20j. Thus, by fixing the fuel pressure sensor 20a to the fuel inlet 22 of the injector 20 in this way, fuel pressure P (inlet pressure) at the fuel inlet 22 can be sensed at any time. More specifically, a fluctuation waveform of the fuel pressure accompanying an injection operation of the injector 20, a fuel pressure level (i.e., stable pressure), fuel injection pressure and the like can be sensed (measured) with the output of the fuel pressure sensor 20a.

The fuel pressure sensors 20a are provided to the multiple injectors 20(#1) to 20(#4) respectively. The fluctuation waveform of the fuel pressure accompanying the injection operation of the injector 20 concerning a predetermined injection can be sensed with high accuracy based on the outputs of the fuel pressure sensors 20a (as mentioned in more detail later).

A microcomputer mounted in the ECU 30 consists of a CPU (a basic processing unit) for performing various kinds of computation, a RAM as a main memory for temporarily storing data in the process of the computation, computation results and the like, a ROM as a program memory, an EEPROM as a memory for data storage, a backup RAM (a memory invariably supplied with power from a backup power supply such as an in-vehicle battery even after a main power supply of the ECU 30 is stopped), and the like. Various kinds of programs, control maps and the like concerning the engine control including the program concerning the fuel injection control are beforehand stored in the ROM, and the various kinds of control data including the design data of the target engine are beforehand stored in the memory for data storage (for example, the EEPROM).

The ECU 30 calculates a rotation angle position, rotation speed (engine rotation speed NE) of an output shaft (a crankshaft 41) of the target engine based on a sensing signal inputted from a crank angle sensor 42. The ECU 30 calculates an operation amount ACCP (a pressed amount) of an accelerator by the driver based on a sensing signal inputted from an accelerator sensor 44. The ECU 30 grasps the operation state of the target engine and requests of a user based on the sensing signals of the above-described various sensors 42, 44 and other various sensors mentioned later. The ECU 30 performs various kinds of control relating to the above-described engine in the optimum modes corresponding to the situation of each time by operating the various actuators such as the above-described suction control valve 11c and the injectors 20 in accordance with the operation state of the target engine and the requests of the user.

Next, an outline of control of the fuel system performed by the ECU 30 will be explained.

The microcomputer of the ECU 30 calculates the fuel injection quantity in accordance with the engine operation state (such as the engine rotation speed NE), the operation amount ACCP of the accelerator by the driver and the like at each time and outputs an injection control signal (an injection command signal) for directing the fuel injection with the calculated fuel injection quantity to the injector 20 in synchronization with desired injection start timing. When the injector 20 operates with a drive amount (for example, a valve opening period) corresponding to the injection control signal, the output torque of the target engine is controlled to a target value.

Figure 3:
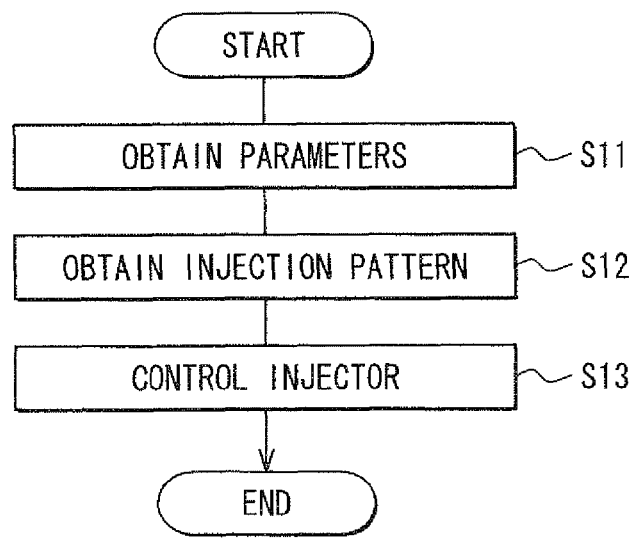
FIG. 3 is a flowchart showing a basic procedure of fuel injection control processing according to the first embodiment.

Hereafter, a fundamental processing procedure of the fuel system control according to the present embodiment will be explained with reference to FIG. 3. Values of the various parameters used in the processing shown in FIG. 3 are stored at any time in the storage device mounted in the ECU 30 such as the RAM, the EEPROM or the backup RAM and are updated at any time when necessary. Basically, the ECU 30 executes the program stored in the ROM to perform the processing shown by the flowchart of FIG. 3.

As shown in FIG. 3, first in S11 (S means "Step") in a series of the processing, predetermined parameters such as the current engine rotation speed NE (i.e., an actual measurement value measured by the crank angle sensor 42) and the fuel pressure P (i.e., an actual measurement value measured by the fuel pressure sensor 20a) are read and also the accelerator operation amount ACCP (i.e., an actual measurement value measured by the accelerator sensor 44) by the driver at the time and the like are read.

In following S12, an injection pattern is set based on the various parameters read in S11. For example, in the case of a single-stage injection, an injection quantity (an injection period) of the injection is variably set in accordance with the torque that should be generated in the output shaft (the crankshaft 41), i.e., the request torque that is calculated from the accelerator operation amount ACCP and the like and that is equivalent to the engine load at the time. In the case of a multi-stage injection, a total injection quantity (a total injection period) of injections contributing to the torque is variably set in accordance with the torque that should be generated in the crankshaft 41, i.e., the request torque.

The injection pattern is obtained based on a predetermined map (an injection control map or a mathematical expression) and a correction coefficient stored in the ROM, for example. More specifically, the optimum injection pattern (adaptation values) is beforehand obtained by experiment and the like in anticipated ranges of the predetermined parameters (read in S11) and is written in the injection control map, for example.

For example, the injection pattern is defined by parameters such as the number of injection stages (i.e., the time number of injections performed during one combustion cycle), the injection start timing of each injection and the injection period (equivalent to the injection quantity) of each injection. Thus, the above-described injection control map indicates the relationship between the parameters and the optimum injection pattern.

The injection pattern obtained based on the injection control map is corrected with the correction coefficient (stored in the EEPROM in the ECU 30, for example) that is separately updated. For example, a set value is calculated by dividing the map value by the correction coefficient. Thus, the injection pattern of the injection that should be performed at the time and eventually the injection command signal for the injector 20 corresponding to the injection pattern are acquired. The correction coefficient (more strictly, a predetermined coefficient out of the multiple types of coefficients) is sequentially updated by separate processing during the operation of the internal combustion engine.

When the injection pattern is set (in S12), maps set individually for the respective elements of the injection pattern (such as the injection start timing) may be used. Alternatively, maps, each of which is made for some collective elements of the injection pattern, or a map for all the elements of the injection pattern may be used.

The thus-set injection pattern or the eventual command value (the injection command signal) corresponding to the injection pattern is used in following S13. That is, in S13 (a controlling section), the drive of the injector 20 is controlled based on the command value (the injection command signal), or in more detail, by outputting the injection command signal to the injector 20. After the drive control of the injector 20, the series of the processing shown in FIG. 3 is ended.

Next, processing for estimating the fuel injection start timing, the fuel injection quantity and the like will be explained with reference to FIG. 4.

Figure 4:
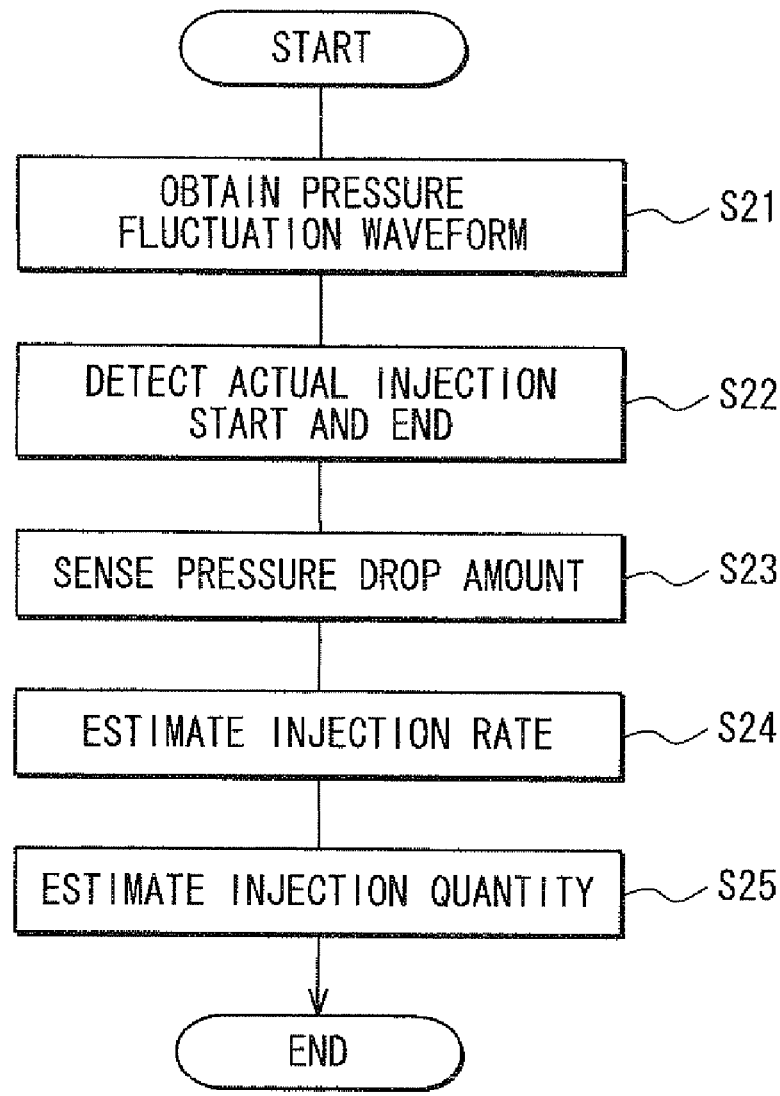
FIG. 4 is a flowchart showing an estimation processing procedure of fuel injection start timing and the like according to the first embodiment.

A series of processing shown in FIG. 4 is performed in a predetermined cycle (for example, a cycle of the computation performed by the CPU described above) or at a predetermined crank angle. First, in S21, the output value (a fuel pressure sensing value P) of the fuel pressure sensor 20*a* is taken. This processing for taking in the output value is performed for each of the multiple fuel pressure sensors 20*a*. Hereafter, the output value taking processing of S21 will be explained in more detail with reference to FIG. 5.

Figure 5:
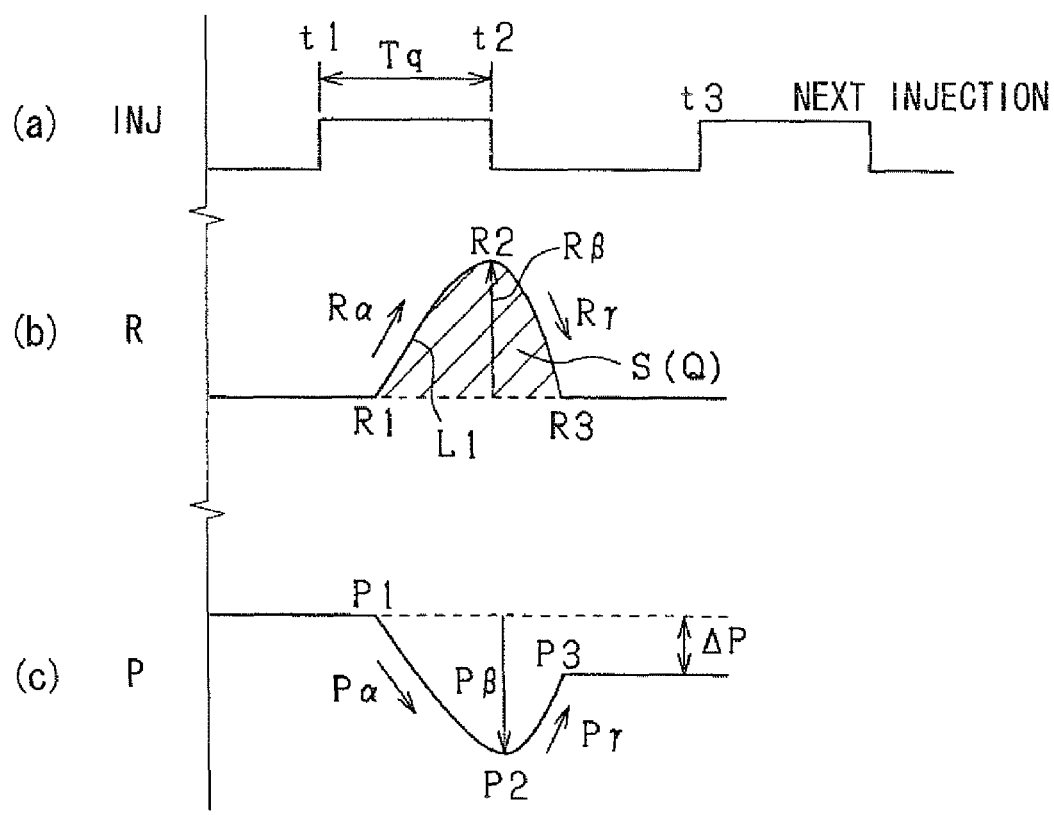
FIG. 5 is a time chart showing a relationship between a sensed pressure fluctuation waveform and an injection rate transition waveform according to the first embodiment.

Part (a) of FIG. 5 shows the injection command signal INJ outputted to the injector 20 in S13 of FIG. 3. The solenoid 20*b* is operated by switch-on of a pulse (i.e., pulse-on) of the command signal, and thus the injection holes 20*f* are opened. That is, an injection start is commanded at pulse-on timing t1 of the injection command signal, and an injection end is commanded at pulse-off timing t2. Therefore, the injection quantity Q is controlled by controlling a valve opening period Tq of the injection holes 20*f* by a pulse-on period (i.e., an injection command period) of the command signal INJ. Part (b) of FIG. 5 shows change (transition) of a fuel injection rate R of the fuel from the injection holes 20*f* caused in connection with the above-described injection command. Part (c) of FIG. 5 shows change (a fluctuation waveform) of the fuel pressure sensing value P of the fuel pressure sensor 20*a* caused with change of the injection rate R.

The ECU 30 senses the output value of the fuel pressure sensor 20*a* by subroutine processing separate from the processing of FIG. 4. The ECU 30 sequentially obtains the output value of the fuel pressure sensor 20*a* by the subroutine processing at an interval short enough to plot the profile of the pressure transition waveform with the sensor output, i.e., at an interval shorter than the processing cycle of FIG. 4. An example profile is illustrated in part (c) of FIG. 5. More specifically, the sensor output is serially obtained at an interval shorter than 50 microseconds (or more preferably, 20 microseconds).

The transition waveform of the injection rate R can be estimated from the fluctuation waveform of the sensed pressure P since there is a correlation between the fluctuation of the pressure P (i.e., the fuel pressure sensing value) sensed by the fuel pressure sensor 20*a* and the change of the injection rate R as explained below. That is, after timing t1 when the injection start command is outputted as shown in part (a) of FIG. 5, the injection rate R starts increasing at timing R1 and the injection is started. As the injection rate R starts increasing at the timing R1, the sensed pressure P starts decreasing at a changing point P1. Then, as the injection rate R reaches the maximum injection rate at timing R2, the decrease of the sensed pressure P stops at a changing point P2. Then, as the injection rate R starts decreasing at the timing R2, the sensed pressure P starts increasing at the changing point P2. Then, as the injection rate R becomes zero and the actual injection ends at timing R3, the increase of the sensed pressure P stops at a changing point P3.

Thus, the increase start timing R1 (actual injection start timing) and the decrease end timing R3 (actual injection end timing) of the injection rate R can be estimated by detecting the changing points P1 and P3 in the fluctuation of the sensed pressure P sensed by the fuel pressure sensor 20*a*. Moreover, the change of the injection rate R can be estimated from the fluctuation of the sensed pressure P based on the correlation between the fluctuation of the sensed pressure P and the change of the injection rate R as explained below.

That is, there is a correlation between a pressure decrease rate Pα from the changing point P1 to the changing point P2 of the sensed pressure P and an injection rate increase rate Rα from the changing point R1 to the changing point R2 of the injection rate R. There is a correlation between a pressure increase rate Pγ from the changing point P2 to the changing point P3 and an injection rate decrease rate Rγ from the changing point R2 to the changing point R3. There is a correlation between a pressure decrease amount Pβ (the maximum drop amount) from the changing point P1 to the changing point P2 and an injection rate increase amount Rβ from the changing point R1 to the changing point R2. Accordingly, the injection rate increase rate Rα, the injection rate decrease rate Rγ, and the injection rate increase amount Rβ of the injection rate R can be estimated by sensing the pressure decrease rate Pα, the pressure increase rate Pγ, and the pressure decrease amount Pβ from the fluctuation of the sensed pressure P sensed by the fuel pressure sensor 20*a*. As described above, the various states R1, R3, Rα, Rβ, and Rγ of the injection rate R can be estimated, and eventually, the change (the transition waveform) of the fuel injection rate R shown in part (b) of FIG. 5 can be estimated.

An integration value of the injection rate R from the actual injection start to the actual injection end (i.e., a shaded area indicated by the mark S in part (b) of FIG. 5) corresponds to the injection quantity Q. An integration value of the pressure P in a portion of the fluctuation waveform of the sensed pressure P corresponding to the change of the injection rate R from the start to the end of the actual injection (i.e., a portion from the changing point P1 to the changing point P3) is correlated with the integration value S of the injection rate R. Therefore, the injection rate integration value S equivalent to the injection quantity Q can be estimated by calculating the pressure integration value from the fluctuation of the sensed pressure P sensed by the fuel pressure sensor 20*a*.

In S22 (an injection start timing calculating section) subsequent to S21 of FIG. 4 described above, appearance timings of the changing points P1, P3 are detected based on the fluctuation waveform obtained in S21. More specifically, it is preferable to calculate a first order differential value of the fluctuation waveform and to detect the appearance of the changing point P1 when the differential value exceeds a threshold value for the first time after the pulse-on timing t1 of the injection command. Moreover, in the case where a stable state occurs after the appearance of the changing point P1, it is preferable to detect the appearance of the changing point P3 when the differential value falls below the threshold value for the last time before the stable state. The stable state is a state, in which the differential value fluctuates within the range of the threshold value.

In following S23, the pressure decrease amount Pβ is sensed based on the fluctuation waveform obtained in S21. For example, the pressure decrease amount Pβ is sensed by subtracting the sensed pressure P at the changing point P1 from a peak value of the sensed pressure P between the changing point P1 and the changing point P3 of the fluctuation waveform.

In following S24, the increase start timing R1 (the actual injection start timing) and the decrease end timing R3 (the actual injection end timing) of the injection rate R are estimated based on the sensing results P1, P3 in S22. Moreover, the injection rate increase amount Rβ is estimated based on the sensing result Pβ of S23. Then, the transition waveform of the injection rate R as shown in part (b) of FIG. 5 is calculated at least based on the estimates R1, R3, Rβ. The values R2, Rα, Rγ and the like may be estimated in addition to the estimates R1, R3, Rβ and may be used to calculate the injection rate transition waveform.

In following S25, the area S is calculated by performing integration of the injection rate transition waveform calculated in S24 in an interval from R1 to R3. The area S is estimated as the injection quantity Q. Thus, a series of processing of FIG. 4 is completed. The fuel injection quantity Q estimated in S25 and the injection rate transition waveform estimated in S24 are used for updating (i.e., learning) the above-described injection control map used in S11 of FIG. 3, for example.

Next, an intake-exhaust system of the engine will be explained with reference to FIGS. 6 and 7.

Figure 6:
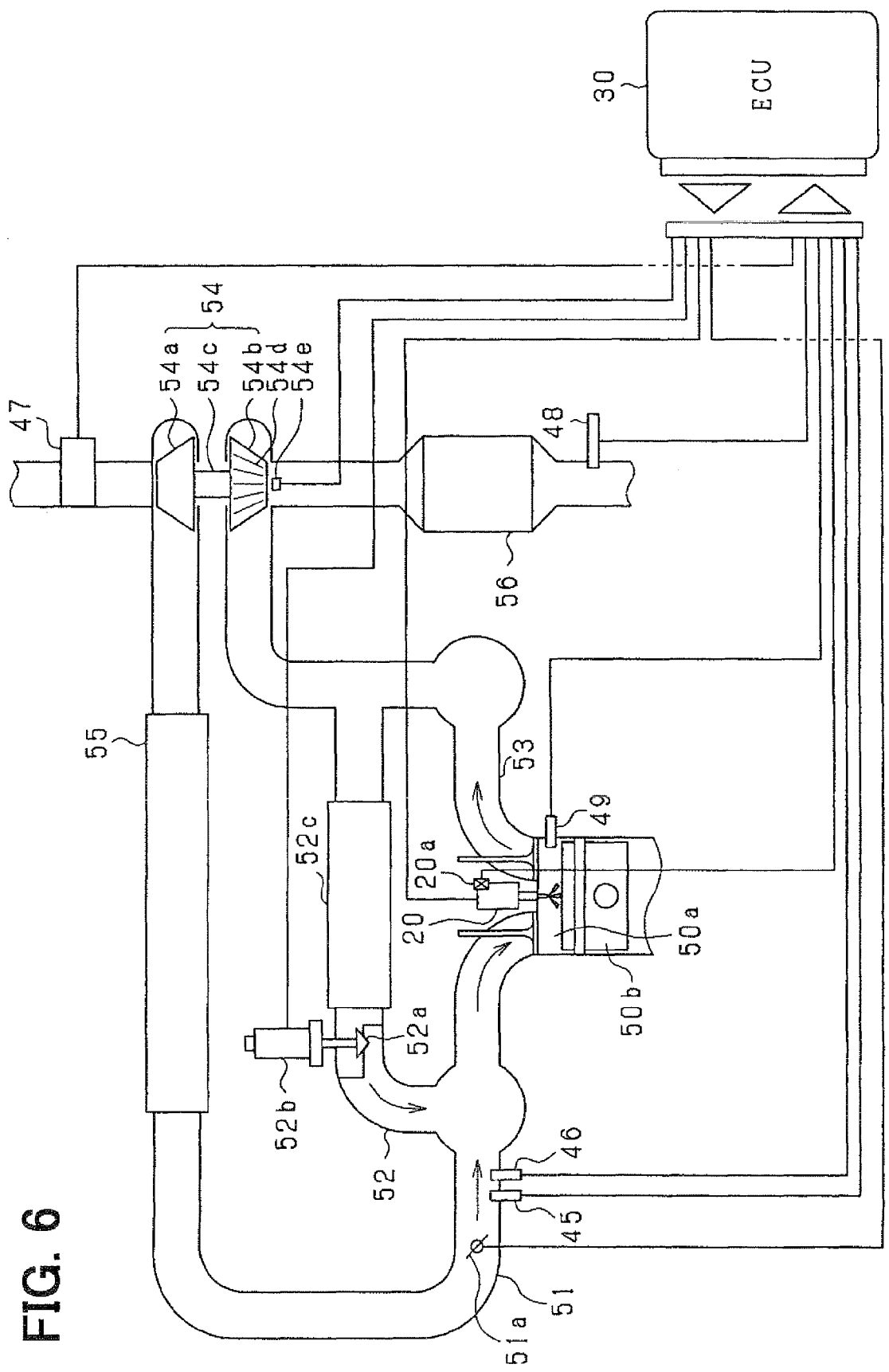
FIG. 6 is a configuration diagram showing an intake-exhaust system according to the first embodiment.

FIG. 6 is a configuration diagram showing the intake-exhaust system of the engine shown in FIG. 1. The engine has an EGR pipe 52 for recirculating exhaust gas from an exhaust system to an intake system. The engine returns a part of the exhaust gas to an intake pipe 51, thereby lowering the combustion temperature and reducing the NOx, for example. An EGR valve 52a for regulating an EGR quantity (i.e., an exhaust gas recirculation quantity) is provided in the EGR pipe 52. An electric actuator 52b causes the EGR valve 52a to perform opening-closing action. The EGR quantity is maximized at the time of fully-opening action of the EGR valve 52a and is brought to zero at the time of fully-closing action of the EGR valve 52a. An EGR cooler 52c is provided in the EGR pipe 52 for cooling the recirculated exhaust gas, thereby reducing the volume (i.e., increasing the density) of the recirculated exhaust gas. Thus, the EGR cooler 52c aims to improve a charging efficiency of the intake air flowing into a combustion chamber 50a.

In the intake pipe 51, a throttle valve 51a that adjusts a flow rate of a fresh air in the intake air flowing into the combustion chamber 50a is provided upstream of a portion of the intake pipe 51, to which the EGR pipe 52 is connected. An electric actuator (not illustrated) causes the throttle valve 51a to perform opening-closing action. The fresh air quantity is maximized at the time of fully-opening action of the throttle valve 51a and is brought to zero at the time of fully-closing action of the throttle valve 51a. In the intake pipe 51, an intake pressure sensor 45 and an intake temperature sensor 46 are provided upstream of a portion of the intake pipe 51, to which the EGR pipe 52 is connected. The intake pressure sensor 45 senses intake pressure (which is also supercharging pressure of a turbocharger mentioned later). The intake temperature sensor 46 senses intake air temperature, Sensing signals of the sensors 45, 46 are outputted to the ECU 30.

A turbocharger 54 (a supercharger) is provided between the intake pipe 51 and the exhaust pipe 53. The turbocharger 54 has a compressor impeller 54a provided in the intake pipe 51 and a turbine wheel 54b provided in the exhaust pipe 53. The compressor impeller 54a and the turbine wheel 54b are connected through a shaft 54c. In the turbocharger 54, the turbine wheel 54b is rotated by the exhaust gas flowing through the exhaust pipe 53, and the rotating force is transmitted to the compressor impeller 54a through the shaft 54c. The intake air flowing through the inside of the intake pipe 51 is compressed by the compressor impeller 54a, and supercharge is performed.

As the turbocharger 54 according to the present embodiment, a variable capacity turbocharger capable of variably setting a rate of converting a fluid energy of the exhaust gas into the rotational driving force of the shaft 54c is adopted. More specifically, the turbine wheel 54b is provided with multiple variable vanes 54d for varying the flow velocity of the exhaust gas blowing against the turbine wheel 54b. An actuator 54e causes the variable vanes 54d to perform opening-closing action in a mutually synchronized manner. The exhaust gas flow rate is adjusted by changing a size of a gap between the adjacent variable vanes 54d (that is, an opening degree of the variable vanes 54d). Thus, the rotation speed of the turbine wheel 54b is adjusted. Thus, a quantity of the air compulsorily supplied to the combustion chamber 50a, i.e., supercharging pressure, is adjusted by adjusting the rotation speed of the turbine wheel 54b.

The air supercharged by the turbocharger 54 is cooled by an intercooler 55 and then fed to the downstream side of the intercooler 55. The intake air is cooled by the intercooler 55 to reduce the volume (i.e., to increase the density) of the intake air, thereby improving the charging efficiency of the intake air flowing into the combustion chamber 50a.

An airflow meter 47 (an intake air quantity sensor) for sensing a mass flow rate of the intake air inflowing per unit time (which is simply referred to as an intake air quantity or an intake quantity hereafter) is fixed to a portion of the intake pipe 51 upstream of the compressor impeller 54a. A hot wire type airflow meter that indirectly senses the intake quantity by sensing change of a heat amount taken from a heating element in accordance with the intake flow rate is adopted as the airflow meter 47 according to the present embodiment.

A purification device 56 for purifying the exhaust gas is fixed to a portion of the exhaust pipe 53 downstream of the turbine wheel 54b. An example of the purification device 56 includes a DPF (diesel particulate filter) for collecting particulate matters in the exhaust gas, a NOx catalyst for purifying NOx in the exhaust gas, an oxidation catalyst for purifying HC and CO in the exhaust gas, and the like.

An A/F sensor 48 (an oxygen concentration sensor) for sensing an oxygen concentration in the exhaust gas is fixed to a portion of the exhaust pipe 53 downstream of the purification device 56. The A/F sensor 48 is an oxygen concentration sensor that outputs an oxygen concentration sensing signal corresponding to an exhaust gas oxygen concentration of each time. Generally, adjustment is made such that the oxygen concentration sensing signal as the sensor output of the A/F sensor 48 changes linearly in accordance with the oxygen concentration. In place of the A/F sensor 48, an O2 sensor of an electromotive force output type that outputs an electromotive force signal varying in accordance with whether the exhaust gas is rich or lean may be used.

A cylinder pressure sensor 49 for sensing pressure in the combustion chamber 50a is fixed to each of the multiple cylinders. Alternatively, the cylinder pressure sensor 49 may be fixed only to a representative cylinder, and various calculation and control may be performed by regarding that the cylinder pressure of the other cylinders is the same as the cylinder pressure of the representative cylinder. A direct insertion type sensor is adopted as the cylinder pressure sensor 49 according to the present embodiment. The cylinder pressure sensor 49 senses the cylinder pressure using a piezoelectric element or a strain gauge. 50*b* in FIG. 6 indicates a piston.

Next, an outline of control of the intake-exhaust system performed by the ECU 30 will be explained.

Figure 7:
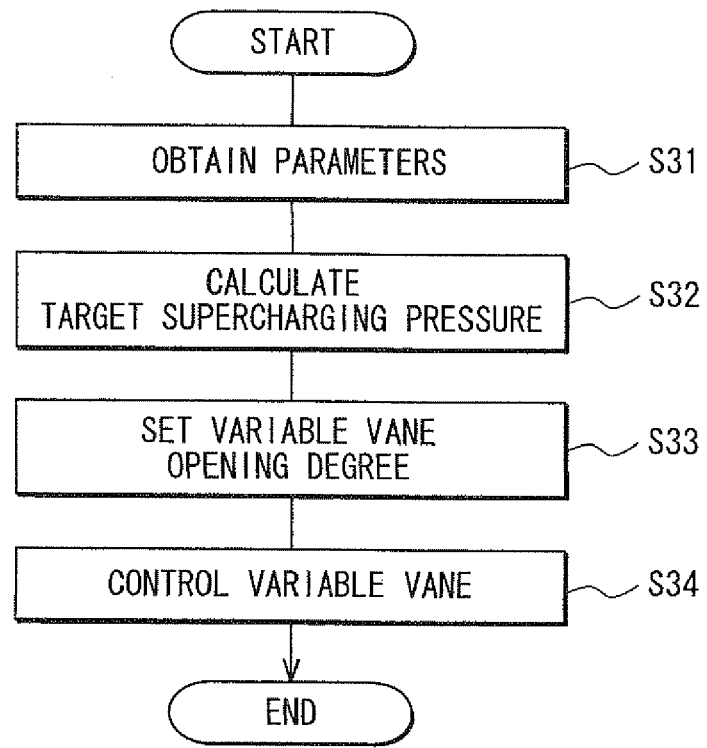
FIG. 7 is a flowchart showing a basic procedure of supercharging pressure control processing according to the first embodiment.

The processing shown in FIG. 7 is for adjusting the capacity of the variable capacity turbocharger 54 and for controlling the supercharging pressure. The processing is performed by the microcomputer of the ECU 30 in a predetermined cycle (for example, in a cycle of the computation performed by the CPU). First in S31, predetermined parameters are read. For example, the predetermined parameters include the intake air quantity sensed with the airflow meter 47, the engine rotation speed NE, the fuel injection quantity set in above-mentioned S11 (i.e., the injection command signal) or the injection quantity sensed (estimated) in S25, the intake pressure (supercharging pressure) sensed with the intake pressure sensor 45, and the intake air temperature sensed with the intake temperature sensor 46.

In following S32, target supercharging pressure is set based on the various parameters read in S31. The target supercharging pressure is calculated based on a predetermined computing equation, a map or the like stored in the above-described ROM, for example. In following S33, the opening degree of the variable vanes 54*d* (the vane opening degree) is set using a supercharge control map stored in the above-described EEPROM or the like based on the target supercharging pressure calculated in above-described S32. That is, the supercharge control map is for defining the relationship between the target supercharging pressure and the vane opening degree. For example, the optimum vane opening degree (the adaptation value) is beforehand obtained by experiment and the like in an anticipated range of the target supercharging pressure and is written in the supercharge control map. The supercharge control map is serially updated and learned during the operation of the internal combustion engine by separate processing (refer to FIG. 9) described later.

In following S34 (a controlling section), drive control of the actuator 54*e* is performed to achieve the vane opening degree set in above-described S33, thereby controlling the opening degree of the variable vanes 54*d* to the set opening degree. After the drive control of the variable vanes 54*d*, the series of the processing shown in FIG. 7 is ended.

Figure 8:
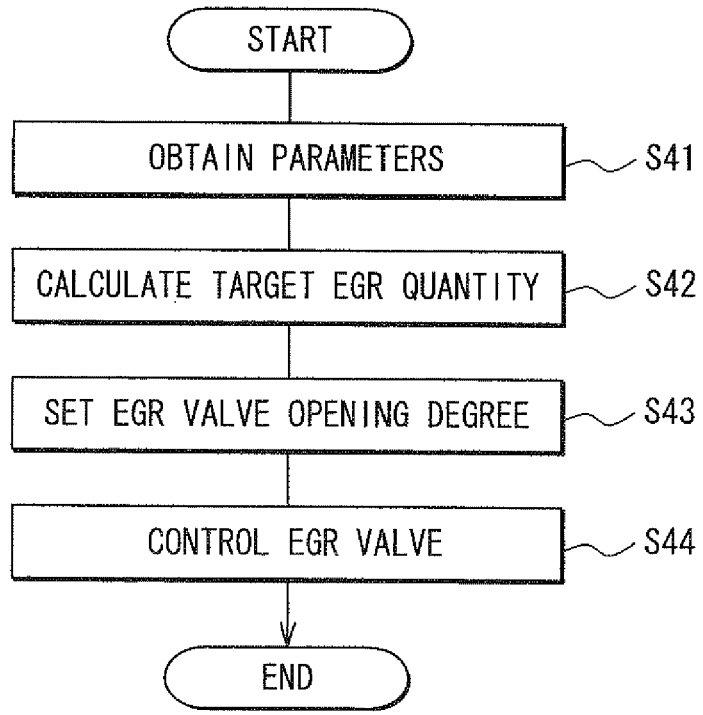
FIG. 8 is a flowchart showing a basic procedure of EGR quantity control processing according to the first embodiment.

Processing shown in FIG. 8 is for adjusting the opening degree of the EGR valve 52*a*, thereby controlling the EGR quantity. The processing of FIG. 8 is performed by the microcomputer of the ECU 30 in a predetermined cycle (for example, the cycle of the computation performed by the CPU mentioned above). First in S41, predetermined parameters such as the exhaust gas oxygen concentration sensed with the A/F sensor 48, the engine rotation speed NE and the fuel injection quantity (the injection command signal) set in S11 or the injection quantity sensed (estimated) in S25 are read.

In following S42, a target EGR quantity is set based on the various parameters read in S41. The target EGR quantity is calculated based on a predetermined computing equation, a map or the like stored in the above-described ROM, for example. In following S43, the opening degree of the EGR valve 52*a* is set using an EGR control map stored in the above-described EEPROM or the like based on the target EGR quantity calculated in above-described S42. That is, the EGR control map is for defining the relationship between the target EGR quantity and the EGR valve opening degree. For example, the optimum EGR valve opening degree (the adaptation value) is beforehand obtained by experiment and the like in an anticipated range of the target EGR quantity and is written in the EGR control map. The EGR control map is serially updated and learned during the operation of the internal combustion engine by separate processing (refer to FIG. 9) mentioned later.

In following S44 (a controlling section), drive control of the actuator 52*b* is performed to achieve the EGR valve opening degree set in above-described S43, thereby controlling the opening degree of the EGR valve 52*a* to the set opening degree. After the drive control of the EGR valve 52*a*, the series of the processing shown in FIG. 8 is ended.

The microcomputer of the ECU 30 controls the opening degree of the throttle valve 51*a* based on the intake air quantity sensed with the airflow meter 47, the opening degree of the EGR valve 52*a* and the like. For example, the microcomputer decreases the opening degree of the throttle valve 51*a* when a load of the engine is low, thereby increasing the EGR quantity. The microcomputer increases the opening degree of the throttle valve 51*a* when the load is high, thereby increasing the fresh air quantity.

Next, correction processing for correcting the EGR quantity, the supercharging pressure, and the injection start timing in accordance with the combustion characteristic of each cylinder will be explained with reference to FIGS. 9 and 10.

Figure 9:
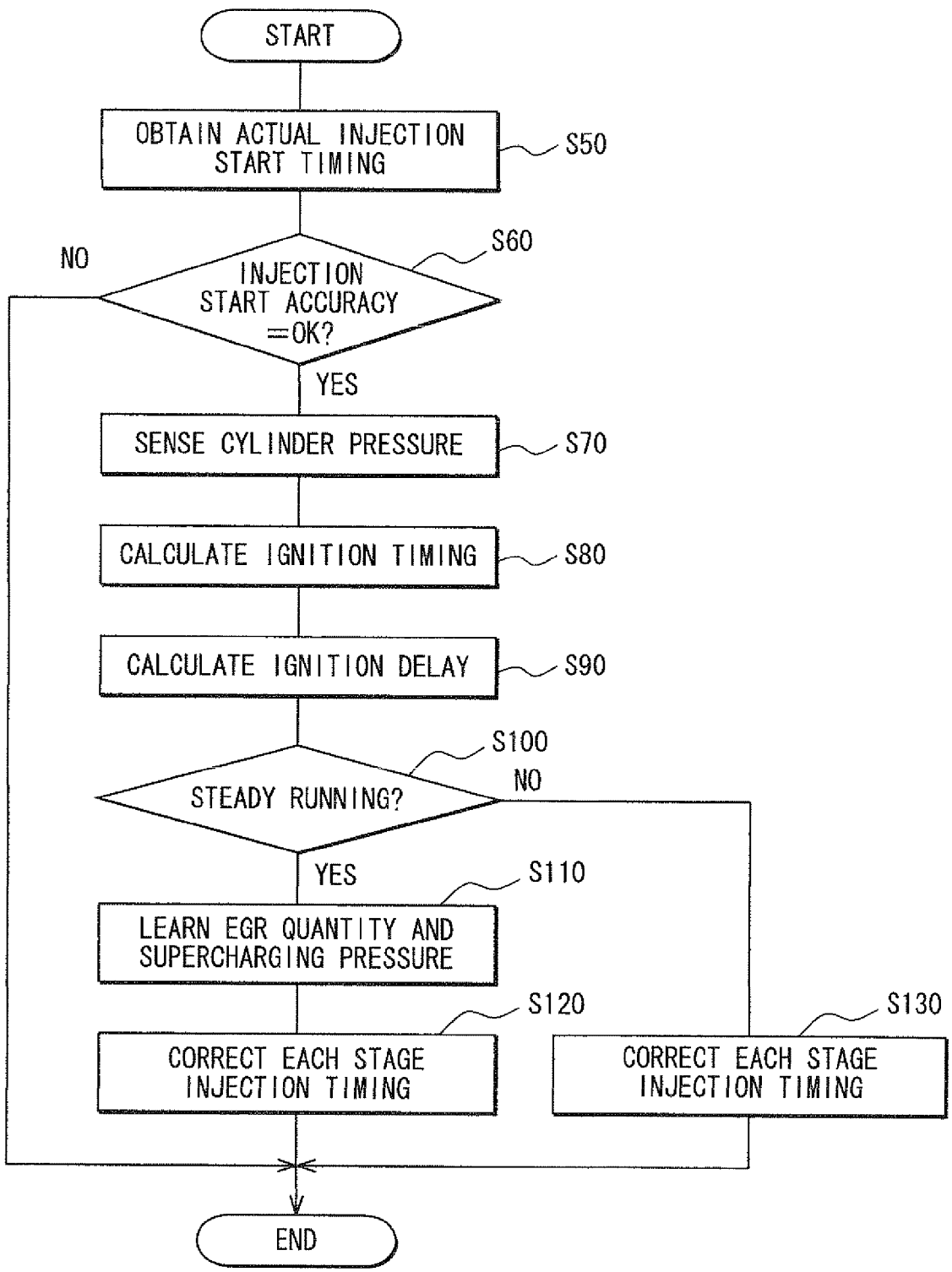
FIG. 9 is a flowchart showing correction processing for correcting the EGR quantity, the supercharging pressure, and the injection start timing according to the first embodiment.
Figure 10:
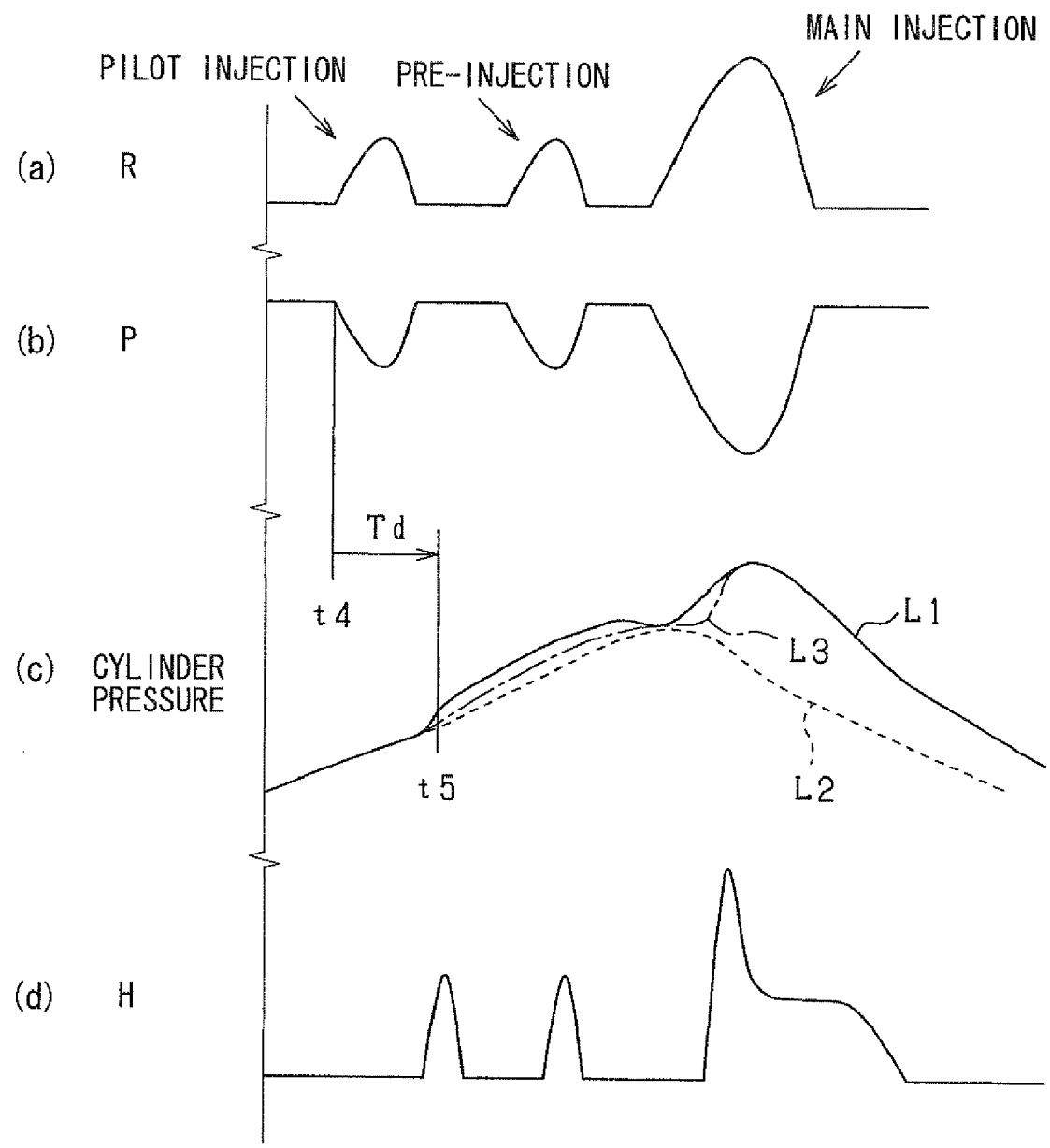

Processing shown in FIG. 9 is performed by the microcomputer of the ECU 30 every time the injection command signal is outputted in S13 of FIG. 3. The processing of FIG. 9 is performed for each cylinder. First, in S50 (a fuel pressure obtaining section), the actual injection start timing calculated in S22 of FIG. 4 is obtained. That is, timing when the changing point P1 shown in part (c) of FIG. 5 appears is obtained from the fluctuation waveform of the sensed pressure P sensed by the fuel pressure sensor 20*a* as the actual injection start timing. In the case where the multistage injection is performed, injection start timing of the first injection stage (a pilot injection in an example of FIG. 10) is obtained.

In following S60, it is determined whether the accuracy of the injection start timing obtained in S50 is sufficiently high. For example, the processing of FIG. 4 may be repeated for each fuel injection, and it may be determined that the accuracy of the obtained injection start timing is sufficiently high if a variation in the multiple injection start timings obtained as the result of the repetition of the processing is within a predetermined range. When it is determined that the accuracy is not sufficiently high, the series of processing of FIG. 9 is once ended.

The process proceeds to S70 if it is determined that the accuracy is sufficiently high (S60: YES). In S70, the cylinder pressure sensing value (refer to part (c) of FIG. 10) sensed with the cylinder pressure sensor 49 is obtained. FIG. 10 shows temporal changes of the various values in the case where the multi-stage injection for performing a pilot injection and a pre-injection before a main injection is performed. Part (b) of FIG. 10 shows a fluctuation waveform (a fuel pressure sensing value P) obtained with the fuel pressure sensor 20*a* in S21 of FIG. 4. Part (a) of FIG. 10 shows a transition of the injection rate R estimated in S24. In part (c) of FIG. 10, a solid line L1 shows a fluctuation waveform (a cylinder pressure sensing value) sensed with the cylinder pressure sensor 49 during a combustion period and a broken line L2 shows a fluctuation waveform (a cylinder pressure sensing value) during a non-combustion period. Part (d) of FIG. 10 shows a transition of a heat release rate H calculated from the cylinder pressure sensing value during the combustion period.

For example, the heat release rate H may be calculated by a following formula: $H=(VdP+\kappa PdV)/\kappa-1$, wherein P is the cylinder pressure, V is the volume of the combustion chamber $50a$, and $\kappa$ is the ratio of specific heat.

In following S80 (an ignition timing calculating section), actual ignition timing t5 when ignition actually occurs is calculated based on the change in the cylinder pressure or the change in the heat release rate H. For example, time when an increase rate of the cylinder pressure or the heat release rate H exceeds a threshold value is calculated as the ignition timing t5. In following S90 (a combustion characteristic calculating section), an ignition delay Td from the injection start to the ignition is calculated based on the actual injection start timing t4 of the pilot injection obtained in S50 and the actual ignition timing t5 calculated in S80. It can be said that the ignition delay Td calculated for each cylinder indicates a combustion characteristic specific to the corresponding cylinder. The combustion characteristic results from factors such as various frictions in the cylinder, a compression ratio in the cylinder, a distribution variation in the EGR quantity and the supercharging pressure among the cylinders and the like.

In following S100, it is determined whether the engine is in a steady operation state. More specifically, it is determined whether the fuel pressure sensing value P used as the calculation basis of the actual injection start timing t4 and the cylinder pressure sensing value used as the calculation basis of the actual ignition timing t5 are values sensed when the engine is in a steady operation state. For example, it may be determined that the engine is in the steady operation state when a condition that at least one of the engine rotation speed, the engine load and the vehicle speed remains constant for a specified time or over is satisfied. It may be determined that the engine is in a transient operation state when the condition is not satisfied.

When it is determined that the engine is in the steady operation state (S100: YES), the process proceeds to S110. In S110, the EGR quantity and the supercharging pressure are corrected in accordance with the value of the ignition delay Td calculated in S90. That is, when the ignition delay Td is shorter than an ideal time (i.e., an assumed time), correction for increasing the EGR quantity is performed and correction for decreasing the supercharging pressure is performed such that the combustion is restricted and the ignition delay Td approximates to the assumed time. When the ignition delay Td is longer than the ideal time, correction for decreasing the EGR quantity is performed and correction for increasing the supercharging pressure is performed so that the combustion is promoted and the ignition delay Td approximates to the ideal time.

The above-described correction of the supercharging pressure is performed by correcting and learning the value of the supercharge control map used in S33 of FIG. 7. The above-described correction of the EGR quantity is performed by correcting and learning the value of the EGR control map used in S43 of FIG. 8. In place of the learning of the maps, correction learning of computing equations or maps for calculating the target values in S32 and S42 may be performed.

Additional explanation of the ideal time (assumed time) will be given below. In the present embodiment, the actual injection start timing t4 and the actual ignition timing t5 are calculated (S50, S80) and the ignition delay Td is calculated (S90) based on the fuel pressure sensing value P and the cylinder pressure sensing value sensed in a state where the injection start timing t4 and the injection quantity are respectively equalized among the cylinders. Then, the above-described ideal time is set based on the ignition delays Td of the respective cylinders. For example, an average value of the ignition delays Td of the respective cylinders may be used as the above-described ideal time.

In following S120, the injection start timing of the pilot injection is corrected in accordance with the value of the ignition delay Td calculated in S90. That is, when the ignition delay Td is shorter than the ideal time (assumed time), correction for delaying the injection start timing is performed. When the ignition delay Td is longer than the ideal time, correction for advancing the injection start timing is performed. Thus, the ignition delay Td is approximated to the ideal time. Also, injection start timing of any other injection stage (for example, the pre-injection or the main injection) may be corrected in accordance with the value of the ignition delay Td. The above-described correction of the injection start timing is performed by correcting and learning the value of the injection control map used in S12 of FIG. 3.

When it is determined that the engine is in the transient operation state (S100: NO), the process proceeds to S130, in which the injection start timing is corrected as in S120. In such the transient operation state, the correction of the supercharging pressure and the correction of the EGR quantity in S110 are prohibited.

The present embodiment described above exerts following effects.

The cylinder pressure sensing value is obtained with the cylinder pressure sensor 49 and also the fuel pressure sensing value is obtained by using the fuel pressure sensor 20a. The ignition delay Td is calculated as the combustion characteristic of the cylinder based on the ignition timing t5 calculated from the cylinder pressure sensing value and the injection start timing t4 calculated from the fuel pressure sensing value. The injection start timing (the injection mode), the supercharging pressure and the EGR quantity (the intake air conditions) are controlled in a cooperative manner so that the ignition delay Td coincides with the ideal time.

In conventional control, the injection start timing is simply controlled in accordance with the ignition timing. As contrasted thereto, according to the present embodiment, not only the injection start timing (the injection mode) but also the supercharging pressure and the EGR quantity (the intake air conditions) are controlled in the cooperative manner in accordance with the ignition delay Td. Accordingly, both of the injection mode and the intake air conditions can be fully optimized. Moreover, the ignition delay Td used for the cooperative control is calculated from the actual ignition timing t5 detected by the cylinder pressure sensor 49 and the actual injection start timing t4 detected by the fuel pressure sensor 20a. Therefore, the cooperative control of the injection mode and the intake air conditions can be performed with high accuracy to achieve the desired ignition delay.

The actual injection start timing t4 and the actual ignition timing t5 are calculated (S50, S80) and the ignition delay Td is calculated (S90) based on the fuel pressure sensing value P and the cylinder pressure sensing value sensed in the state where the injection start timing t4 and the injection quantity are respectively equalized among the cylinders. Therefore, a factor of the variation among the cylinders resulting from the injection mode is excluded from the ignition delay Td calculated in this way.

If there occurs a variation in the ignition delay Td among the cylinders in a state where the injection mode variation is excluded from the ignition delay Td, that is, if the ignition delay Td of the corresponding cylinder is longer (or shorter) than the average time of the ignition delays Td of the respective cylinders, the variation can be specified as the variation resulting from the intake air conditions. The supercharging pressure and the EGR quantity (the intake air conditions) are corrected in S110 so that the ignition delay Td approximates to the ideal time. Therefore, the cooperative control of the injection mode and the intake air conditions can be performed to achieve the desired ignition delay.

If the intake air condition such as the EGR quantity or the supercharging pressure is changed, there occurs a response delay until the change is reflected in the combustion state. Therefore, in the present embodiment, the supercharging pressure and the EGR quantity (the intake air conditions) are corrected on a condition that the engine operation state is the steady operation state (S100: YES). Thus, decrease in the control accuracy of the ignition delay Td, which can be caused if the intake air conditions are corrected when the engine is in the transient operation state, is avoided.

The ignition delay Td is controlled by correcting the injection start timing (the injection mode) when the engine is in the transient operation state. Accordingly, the ignition delay Td can be controlled close to the desired time even when the engine is in the transient operation state.

Next, a second embodiment of the present invention will be described.

In the above-described first embodiment, the ignition delay Td is calculated as the combustion characteristic in S90 of FIG. 9, and the injection mode and the intake air conditions are corrected in accordance with the ignition delay Td. As contrasted thereto, in the present embodiment, a combustion rate is calculated as a combustion characteristic (refer to S95 of FIG. 11) by performing processing of FIG. 11, and the injection mode and the intake air conditions are corrected in accordance with the combustion rate. Even when a combustion injection quantity is the same, there is a possibility that a rate (a combustion rate) at which the injected fuel contributes to torque generation varies with a combustion characteristic specific to the cylinder. When the combustion rate is low, the cylinder pressure sensing value lowers as shown by a chained line L3 in part (c) of FIG. 10.

Figure 11:
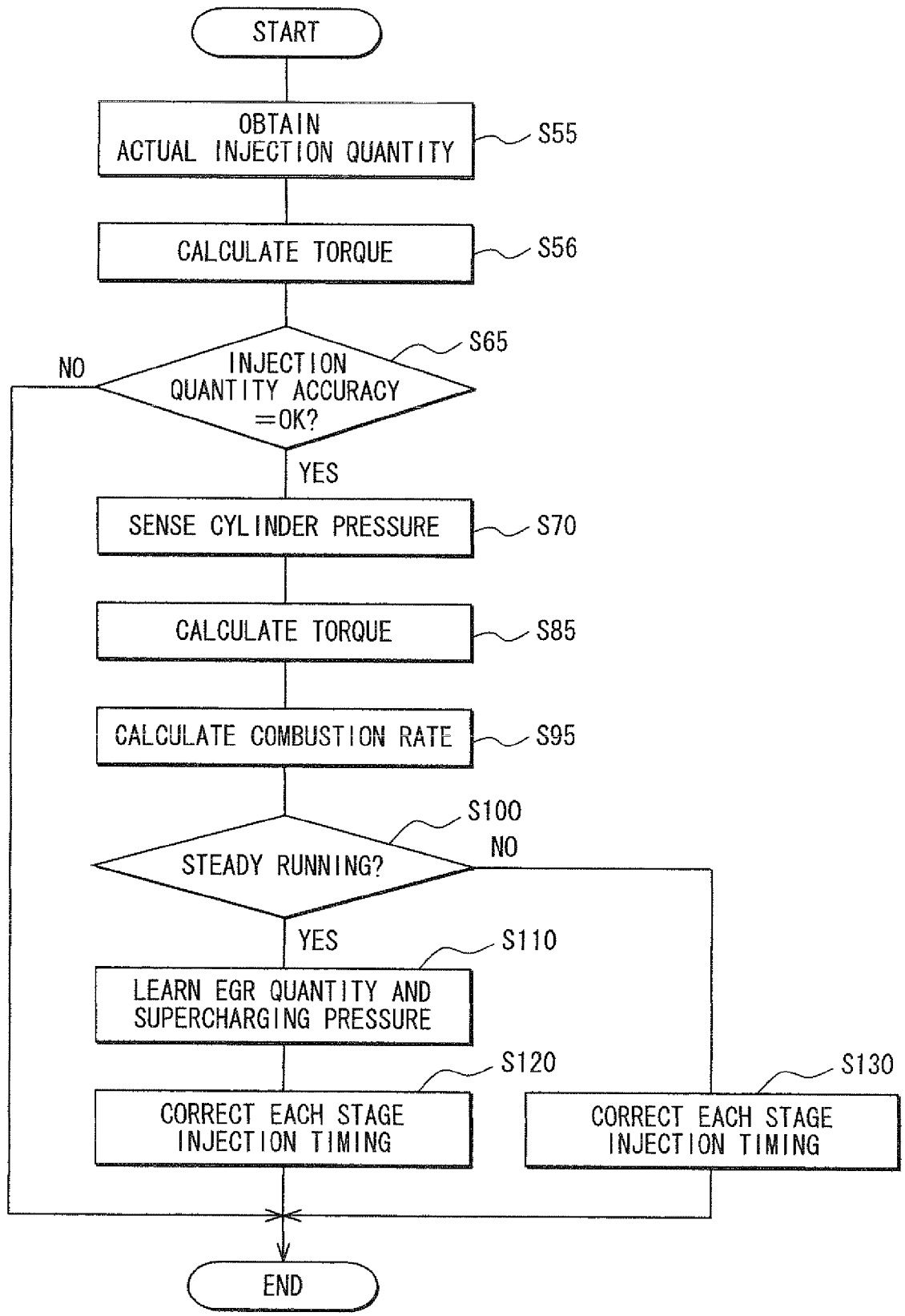
FIG. 11 is a flowchart showing correction processing for correcting an EGR quantity, supercharging pressure, and injection start timing according to a second embodiment of the present invention.

Hereafter, contents of correction processing according to the present embodiment will be explained in more detail with reference to FIG. 11. First, in S55 (a fuel pressure obtaining section), an actual injection quantity calculated in S25 of FIG. 4 is obtained. That is, the area S of the injection rate R shown in part (b) of FIG. 5 is obtained as the actual injection quantity from the fluctuation waveform of the sensed pressure P sensed by the fuel pressure sensor 20a. In the case where the multi-stage injection is performed, a total injection quantity of the respective injections is obtained. In following S56 (a theoretical combustion quantity calculating section), torque generation amount is calculated by converting the injection quantity obtained in S55 into the torque generation amount.

In following S65, it is determined whether the accuracy of the injection quantity obtained in S55 is sufficiently high. For example, the processing of FIG. 4 may be repeated for each fuel injection, and it may be determined that the accuracy of the obtained injection quantity is sufficiently high if a variation in the multiple injection quantities obtained as the result of the repetition of the processing is within a predetermined range. When it is determined that the accuracy is not sufficiently high, the series of processing of FIG. 11 is once ended.

The process proceeds to S70 (a cylinder pressure obtaining section) if it is determined that the accuracy is sufficiently high (S65: YES). In S70, the cylinder pressure sensing value (refer to part (c) of FIG. 10) sensed with the cylinder pressure sensor 49 is obtained. In following S85 (an actual combustion quantity calculating section), actually generated torque (or a physical quantity such as a combustion quantity relating to torque) is calculated based on the change in the cylinder pressure or the heat release rate H. In following S95 (a combustion characteristic calculating section), the torque generation amount (injection quantity conversion torque) calculated in S56 and the torque generation amount (cylinder pressure sensing torque) calculated in S85 are compared with each other, thereby calculating a ratio of the cylinder pressure sensing torque to the injection quantity conversion torque as a combustion rate (an injection characteristic).

When it is determined that the engine is in a steady operation state in following S100 (S100: YES), the process proceeds to S110. In S110, the EGR quantity and the supercharging pressure are corrected in accordance with the value of the combustion rate calculated in S95. That is, when the combustion rate is larger than an ideal rate (an assumed rate), correction for increasing the EGR quantity is performed and correction for decreasing the supercharging pressure is performed so that the combustion is restricted and the combustion rate approximates to the assumed rate. When the combustion rate is smaller than the ideal rate, correction for decreasing the EGR quantity is performed and correction for increasing the supercharging pressure is performed so that the combustion is promoted and the combustion rate approximates to the ideal rate.

The above-described correction of the supercharging pressure is performed by correcting and learning the value of the supercharge control map used in S33 of FIG. 7. The above-described correction of the EGR quantity is performed by correcting and learning the value of the EGR control map used in S43 of FIG. 8. In place of the learning of the maps, correction learning of the computing equations or maps for calculating the target values in S32 and S42 may be performed.

Hereafter, additional explanation of the ideal rate (the assumed rate) will be given. In the present embodiment, the injection quantity conversion torque and the cylinder pressure sensing torque are calculated (S56, S85) and the combustion rate is calculated (S95) based on the fuel pressure sensing value P and the cylinder pressure sensing value sensed in the state where the injection start timing t4 and the injection quantity are respectively equalized among the respective cylinders. The above-described ideal rate is set based on the combustion rates of the respective cylinders, For example, an average value of the combustion rates of the respective cylinders may be used as the above-described ideal rate.

In following S120, the injection start timing of the pilot injection is corrected in accordance with the value of the combustion rate calculated in S95. That is, when the combustion rate is greater than the ideal rate (an assumed rate), correction for delaying the injection start timing is performed. When the combustion rate is smaller than the ideal rate, correction for advancing the injection start timing is performed. Thus, the combustion rate is approximated to the ideal rate. In addition, the injection start timing of any other injection stage (for example, the pre-injection or the main injection) may be corrected in accordance with the value of the combustion rate. The above-described correction of the injection start timing is performed by correcting and learning the value of the injection control map used in S12 of FIG. 3.

When it is determined that the engine is in the transient operation state (S100: NO), the process proceeds to S130, in which the injection start timing is corrected as in S120. In such the transient operation state, the correction of the supercharging pressure and the correction of the EGR quantity in S110 are prohibited.

The present embodiment described above exerts following effects like the first embodiment.

According to the present embodiment, the injection start timing (the injection mode), the supercharging pressure and the EGR quantity (the intake air conditions) are controlled in a cooperative manner to bring the combustion rate as the combustion characteristic of the cylinder to the ideal rate. Accordingly, both of the injection mode and the intake air conditions can be fully optimized. Moreover, the combustion rate used for the cooperative control is calculated from the cylinder pressure sensing torque sensed by the cylinder pressure sensor 49 and the injection quantity conversion torque converted from the actual injection quantity Q sensed by the fuel pressure sensor 20a. Therefore, the cooperative control of the injection mode and the intake air conditions can be performed with high accuracy to achieve the desired combustion rate.

According to the present embodiment, the injection quantity conversion torque and the cylinder pressure sensing torque are calculated (S56, S85) and the combustion rate is calculated (S95) based on the fuel pressure sensing value P and the cylinder pressure sensing value sensed in the state where the injection start timing t4 and the injection quantity are respectively equalized among the respective cylinders. Therefore, a variation factor among the cylinders resulting from the injection mode is excluded from the combustion rate calculated in this way.

If there occurs a variation in the combustion rate among the cylinders in a state where the injection mode variation is excluded from the combustion rate, that is, if the combustion rate of the corresponding cylinder is smaller (or larger) than the average value of the combustion rates of the respective cylinders, the variation can be specified as the variation resulting from the intake air conditions. The supercharging pressure and the EGR quantity (the intake air conditions) are corrected in S110 so that the combustion rate approximates to the ideal rate. Therefore, the cooperative control of the injection mode and the intake air conditions can be performed to achieve the desired combustion rate.

If the intake air condition such as the EGR quantity or the supercharging pressure is changed, there occurs a response delay until the change is reflected in the combustion state. Therefore, according to the present embodiment, the supercharging pressure and the EGR quantity (the intake air conditions) are corrected on a condition that the engine operation state is the steady operation state (S100:YES). Thus, decrease in the control accuracy of the combustion rate, which can be caused if the correction of the intake air conditions is performed when the engine is in the transient operation state, is avoided.

The combustion rate is controlled by correcting the injection start timing (the injection mode) when the engine is in the transient operation state. Accordingly, the combustion rate can be controlled close to the desired rate even when the engine is in the transient operation state.

The above-described embodiments may be modified and implemented as follows, for example. Moreover, the present invention is not limited to the above-described embodiments. Characteristic constructions of the respective embodiments may be combined arbitrarily.

When the EGR quantity and the supercharging pressure are corrected in S110 of FIG. 9, the fuel pressure supplied to the injector 20 may be changed by changing the fuel pressure in the common rail 12 in accordance with the increase/decrease correction quantity of the EGR quantity and the supercharging pressure. For example, an operation of the suction control valve 11c is corrected in accordance with the increase/decrease correction quantity, thereby changing the fuel discharge quantity from the fuel pump 11 to the common rail 12. Thus, the ignition delay Td or the combustion rate can be controlled close to the desired value even when the engine is in the transient operation state.

In order to fix the fuel pressure sensor 20a to the injector 20, in the above embodiments, the fuel pressure sensor 20a is fixed to the fuel inlet 22 of the injector 20. Alternatively, as shown by a chained line 200a in FIG. 2, a fuel pressure sensor 200a may be mounted inside the housing 20e and fuel pressure in the internal fuel passage 25 extending from the fuel inlet 22 to the injection holes 20f may be sensed.

The fixing structure of the fuel pressure sensor 20a as described above can be simplified in the case where the fuel pressure sensor 20a is fixed to the fuel inlet 22 as compared with the case where the fuel pressure sensor 200a is mounted inside the housing 20e. When the fuel pressure sensor 200a is mounted inside the housing 20e, the fixing position of the fuel pressure sensor 200a is closer to the injection holes 20f than in the case where the fuel pressure sensor 20a is fixed to the fuel inlet 22. Therefore, the pressure fluctuation in the injection holes 20f can be sensed more precisely.

The fuel pressure sensor 20a may be fixed to the high-pressure pipe 14. In this case, it is preferable to fix the fuel pressure sensor 20a to a position distanced from the common rail 12 by a predetermined distance.

A flow rate restricting section may be provided between the common rail 12 and the high-pressure pipe 14 for restricting a flow rate of the fuel flowing from the common rail 12 to the high-pressure pipe 14. The flow rate restricting section functions to block the flow passage when an excessive fuel outflow is generated by fuel leakage due to a damage to the high-pressure pipe 14, the injector 20 or the like. For example, the flow rate restricting section may be constituted of a valve member such as a bail that blocks the flow passage when the excessive flow rate occurs. Alternatively, a flow damper constituted by integrally combining the orifice 12a (the fuel pulsation reducing section) and the flow rate restricting section may be adopted.

In addition to the construction of arranging the fuel pressure sensor 20a downstream of the orifice and the flow rate restricting section with respect to the fuel flow direction, the fuel pressure sensor 20a may be arranged downstream of at least one of the orifice and the flow rate restricting section.

An arbitrary number of the fuel pressure sensor(s) 20a may be used. For example, two or more sensors 20a may be provided to the fuel flow passage of one cylinder. A rail pressure sensor for sensing the pressure in the common rail 12 may be provided in addition to the above-described fuel pressure sensor 20a.

In place of the electromagnetic drive injector 20 shown in FIG. 2, a piezo drive injector may be used. Alternatively, an injector that does not cause pressure leak from the leak hole 24 and the like such as a direct acting injector that transmits the drive power not through the oil pressure chamber Cd (for example, a direct acting piezo injector having been developed in recent years) can be also used. In the case where the direct acting injector is used, control of the injection rate is facilitated.

The kind and the system configuration of the engine as the control target can also be arbitrarily modified in accordance with the use and the like. Although the present invention is applied to the diesel engine as an example in each of the above embodiments, the present invention can be also applied to a spark ignition gasoline engine (specifically, a direct-injection engine) or the like basically in the similar way. For example, a fuel injection system of a direct injection gasoline engine generally has a delivery pipe that stores fuel (gasoline) in a high-pressure state. In the system, the fuel is pumped from a fuel pump to the delivery pipe, and the high-pressure fuel in the delivery pipe is distributed to multiple injectors 20 and injected and supplied into engine combustion chambers. In this system, the delivery pipe corresponds to the pressure accumulator. The device and the system according to the present invention can be applied not only to the injector that injects the fuel directly into the cylinder but also to an injector that injects the fuel to an intake passage or an exhaust passage of the engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An internal combustion engine control device controlling an injection mode of fuel injected from an injector provided in an internal combustion engine and a condition of an intake air, which flows into a combustion chamber of the internal combustion engine and which is mixed with the fuel, the control device comprising:
   a cylinder pressure obtaining unit for obtaining a cylinder pressure sensing value from a cylinder pressure sensor that senses pressure in the combustion chamber;
   a fuel pressure obtaining unit for obtaining pressure sensing value from a fuel pressure sensor that senses pressure of the fuel fluctuating in connection with the fuel injection from the injector;
   a combustion characteristic calculating unit for calculating a combustion characteristic concerning combustion in a cylinder based on both of the obtained sensing values of the cylinder pressure sensing value and the fuel pressure sensing value;
   a controlling unit for controlling the injection mode and the intake air condition in accordance with the combustion characteristic calculated by the combustion characteristic calculating unit;
   an ignition timing calculating unit for calculating ignition timing based on the cylinder pressure sensing value; and
   an injection start timing calculating unit for calculating injection start timing of the fuel based on the fuel pressure sensing value; wherein
   the combustion characteristic calculating unit calculates an ignition delay from an injection start to an ignition as the combustion characteristic based on the calculated ignition timing and the calculated injection start timing;
   when the internal combustion engine is in a steady operation state, the controlling unit controls the intake air condition to a condition restricting the combustion if the ignition delay is shorter than an assumed time and controls the intake air to a condition promoting the combustion if the ignition delay is longer than the assumed time;
   the internal combustion engine has an exhaust gas recirculation valve that adjusts an exhaust gas recirculation quantity of exhaust gas recirculated from an exhaust system to an intake system, and
   the controlling unit controls an opening degree of the exhaust gas recirculation valve to increase the exhaust gas recirculation quantity when the ignition delay is shorter than the assumed time and controls the opening degree of the exhaust gas recirculation valve to decrease the exhaust gas recirculation quantity when the ignition delay is longer than the assumed time.

2. The control device as in claim 1, wherein
   the internal combustion engine is a multi-cylinder internal combustion engine having a plurality of injectors, and
   the assumed time is an average value of ignition delays, which are calculated respectively for a plurality of cylinders in a state where the injection start timing and an injection quantity are respectively equalized among the injectors.

3. The control device as in claim 1, wherein
   when the internal combustion engine is in a transient operation state, the controlling unit corrects the injection mode by changing pressure of the fuel supplied to the injector in accordance with a correction value used for increasing or decreasing the exhaust gas recirculation quantity.

4. An internal combustion engine control device controlling an injection mode of fuel injected from an injector provided in an internal combustion engine and a condition of an intake air, which flows into a combustion chamber of the internal combustion engine and which is mixed with the fuel, the control device comprising;
   a cylinder pressure obtaining unit for obtaining a cylinder pressure sensing value from a cylinder pressure sensor that senses pressure in the combustion chamber;
   a fuel pressure obtaining unit for obtaining a fuel pressure sensing value from a pressure sensor that senses pressure of the fuel fluctuating in connection with the fuel injection from the injector;
   a combustion characteristic calculating unit for calculating a combustion characteristic concerning combustion in a cylinder based on both of the obtained sensing values of the cylinder pressure sensing value and the fuel pressure sensing value;
   a controlling unit for controlling the injection mode and the intake air condition in accordance with the combustion characteristic calculated by the combustion characteristic calculating unit;
   an ignition timing calculating unit for calculating ignition timing based on the cylinder pressure sensing value; and
   an injection start timing calculating unit for calculating injection start timing of the fuel based on the fuel pressure sensing value, wherein
   the combustion characteristic calculating unit calculates an ignition delay from an injection start to an ignition as the combustion characteristic based on the calculated ignition timing and the calculated injection star timing;
   when the internal combustion engine is in a steady operation state, the controlling unit controls the intake air condition to a condition restricting the combustion if the ignition delay is shorter than an assumed time and controls the intake air condition to a condition promoting the combustion if the ignition delay is longer than the assumed time;
   the internal combustion engine has a supercharger for supercharging the intake air with the use of the exhaust gas as a source of a driving force,
   the supercharger is configured to be able to vary a conversion rate, at which the supercharger converts a fluid energy of the exhaust gas into the driving force, thereby adjusting supercharging pressure, and
   the controlling unit controls the conversion rate to decrease the supercharging pressure when the ignition delay is shorter than the assumed time and controls the conversion rate to increase the supercharging pressure when the ignition delay is longer than the assumed time.

5. The control device as in claim 4, wherein
when the internal combustion engine is in a transient operation state, the controlling unit corrects the injection mode by changing pressure of the fuel supplied to the injector in accordance with a correction value used for increasing or decreasing the supercharging pressure.

6. The control device as in claim 4, wherein
when the internal combustion engine is in a transient operation state, the controlling unit controls the injection mode to a mode restricting the combustion if the ignition delay is shorter than an assumed time and controls the injection mode to a mode promoting the combustion if the ignition delay is longer than the assumed time.

7. The control device as in claim 6, wherein
the controlling unit controls the injector to delay the injection start timing if the ignition delay is shorter than the assumed time and controls the injector to advance the injection start timing if the ignition delay is longer than the assumed time.

8. An internal combustion engine control device controlling an injection mode of fuel injected from an injector provided in an internal combustion engine and a condition of an intake air, which flows into a combustion chamber of the internal combustion engine and which is mixed with the fuel, the control device comprising:
   a cylinder pressure obtaining unit for obtaining a cylinder pressure sensing value from a cylinder pressure sensor that senses pressure in the combustion chamber;
   a fuel pressure obtaining unit for obtaining a fuel pressure sensing value from a fuel pressure sensor that senses pressure of the fuel fluctuating in connection with the fuel injection from the injector;
   a combustion characteristic calculating unit for calculating a combustion characteristic concerning combustion in a cylinder based on both of the obtained sensing values of the cylinder pressure sensing value and the fuel pressure sensing value; and
   a controlling unit for controlling the injection mode and the intake air condition in accordance with the combustion characteristic calculated by the combustion characteristic calculating unit;
   an actual combustion quantity calculating unit for calculating an actual combustion quantity or a physical quantity equivalent to the actual combustion quantity based on the cylinder pressure sensing value; and
   a theoretical combustion quantity calculating unit for calculating an actual injection quantity based on the fuel pressure sensing value and for calculating a theoretical combustion quantity converted from the calculated actual injection quantity or a physical quantity equivalent to the theoretical combustion quantity, wherein
   the combustion characteristic calculating unit calculates a combustion rate as the combustion characteristic based on the calculated actual combustion quantity and the calculated theoretical combustion quantity, the combustion rate indicating a rate, at which the fuel injected from the injector contributes to the combustion.

9. The control device as in claim 8, wherein
when the internal combustion engine is in a steady operation state, the controlling unit controls the intake air condition to a condition restricting the combustion if the combustion rate is higher than an assumed rate and controls the intake air condition to a condition promoting the combustion if the combustion rate is lower than the assumed rate.

10. The control device as in claim 9, wherein
the internal combustion engine is a multi-cylinder internal combustion engine having a plurality of injectors, and
the assumed rate is an average value of combustion rates, which are calculated respectively for a plurality of cylinders in a state where injection start timing and an injection quantity are respectively equalized among the plurality of injectors.

11. The control device as in claim 9, wherein
the internal combustion engine has an exhaust gas recirculation valve for regulating an exhaust gas recirculation quantity of exhaust gas recirculated from an exhaust system to an intake system, and
the controlling unit controls an opening degree of the exhaust gas recirculation valve to increase the exhaust gas recirculation quantity when the combustion rate is higher than the assumed rate and controls the opening degree of the exhaust gas recirculation valve to decrease the exhaust gas recirculation quantity when the combustion rate is lower than the assumed rate.

12. The control device as in claim 11, wherein
when the internal combustion engine is in a transient operation state, the controlling unit corrects the injection mode by changing pressure of the fuel supplied to the injector in accordance with a correction value used for increasing or decreasing the exhaust gas recirculation quantity.

13. The control device as in claim 9, wherein
the internal combustion engine has a supercharger that supercharges the intake air with the use of the exhaust gas as a source of a driving force,
the supercharger is configured to be able to vary a conversion rate, at which the supercharger converts a fluid energy of the exhaust gas into the driving force, thereby adjusting supercharging pressure, and
the controlling mean unit controls the conversion rate to decrease the supercharging pressure when the combustion rate is higher than an assumed rate and controls the conversion rate to increase the supercharging pressure when the combustion rate is lower than the assumed rate.

14. The control device as in claim 13, wherein
when the internal combustion engine is in a transient operation state, the controlling unit corrects the injection mode by changing pressure of the fuel supplied to the injector in accordance with a correction value used for increasing or decreasing the supercharging pressure.

15. The control device as in claim 8, wherein
when the internal combustion engine is in a transient operation state, the controlling unit controls the injection mode to a mode restricting the combustion if the combustion rate is higher than an assumed rate and controls the injection mode to a mode promoting the combustion if the combustion rate is lower than the assumed rate.

16. The control device as in claim 15, wherein
the controlling unit controls the injector to delay the injection start timing if the combustion rate is higher than the assumed rate and controls the injector to advance the injection start timing if the combustion rate is lower than the assumed rate.

17. The control device as in claim 8, wherein
the internal combustion engine is a multi-cylinder internal combustion engine having a plurality of injectors,
the fuel pressure sensor is provided for each of the plurality of injectors, and
the cylinder pressure sensor is provided to at least one of a plurality of cylinders.

18. The control device as in claim 8, wherein
the internal combustion engine is configured to distribute and supply the fuel from a pressure accumulator, which accumulates the fuel, to the injector, and
the fuel pressure sensor is arranged in a fuel passage, which extends from the pressure accumulator to an injection hole of the injector, at a position closer to the injection hole than the pressure accumulator.

19. The control device as in claim 18, wherein
the fuel pressure sensor is fixed to the injector.

20. The control device as in claim 19, wherein
the fuel pressure sensor is fixed to a fuel inlet of the injector.

21. The control device as in claim 19, wherein
the fuel pressure sensor is mounted inside the injector to sense fuel pressure in an internal fuel passage extending from the fuel inlet of the injector to the injection hole of the injector.

22. The control device as in claim 18, wherein
an orifice is provided in a fuel passage, which extends from the pressure accumulator to a fuel inlet of the injector, for attenuating a pressure pulsation of the fuel in the pressure accumulator, and
the fuel pressure sensor is arranged downstream of the orifice with respect to a fuel flow direction.

23. An internal combustion engine control system comprising:
at least one of a fuel pressure sensor that senses pressure of fuel fluctuating in connection with fuel injection from an injector and a cylinder pressure sensor that senses pressure in a cylinder; and
the internal combustion engine control device as in claim 8.

* * * * *